(12) United States Patent
Furukawa et al.

(10) Patent No.: US 8,300,044 B2
(45) Date of Patent: Oct. 30, 2012

(54) COMPUTER-READABLE RECORDING MEDIUM WHICH STORES KNITTING STRUCTURE MODEL GENERATION PROGRAM, KNITTING STRUCTURE MODEL GENERATION APPARATUS AND KNITTING STRUCTURE MODEL GENERATION METHOD

(75) Inventors: Takao Furukawa, Osaka (JP); Takayuki Arai, Nagoya (JP); Yasuharu Kase, Nagoya (JP); Kiyoshi Kawarazaki, Anjo (JP)

(73) Assignee: Toyota Tsusho Corporation (JP)

( * ) Notice: Subject to any disclaimer, the term of this patent is extended or adjusted under 35 U.S.C. 154(b) by 782 days.

(21) Appl. No.: 12/312,597

(22) PCT Filed: Nov. 20, 2007

(86) PCT No.: PCT/JP2007/072470
§ 371 (c)(1),
(2), (4) Date: May 19, 2009

(87) PCT Pub. No.: WO2008/062795
PCT Pub. Date: May 29, 2008

(65) Prior Publication Data
US 2010/0023305 A1    Jan. 28, 2010

(30) Foreign Application Priority Data
Nov. 21, 2006 (JP) .................. 2006-314826

(51) Int. Cl.
*G06T 15/00* (2011.01)
(52) U.S. Cl. ............ 345/419; 345/420; 66/193; 66/195; 66/202; 442/314; 703/1
(58) Field of Classification Search .................. 345/419, 345/420; 66/202, 193, 195; 442/314; 703/1
See application file for complete search history.

(56) References Cited

U.S. PATENT DOCUMENTS
5,728,448 A * 3/1998 Okeya et al. .................. 428/193
(Continued)

FOREIGN PATENT DOCUMENTS
EP        2 015 205        1/2009
(Continued)

OTHER PUBLICATIONS

Verpoest et al. "Virtual textile composites software Wise-Tex: Integration with micro-mechanical , permeability and structure analysis", published Jul. 26, 2005.*

(Continued)

*Primary Examiner* — Kimbinh T Nguyen
(74) *Attorney, Agent, or Firm* — Gerald E. Hespos; Michael J. Porco

(57) ABSTRACT

A knitting structure model generation program, apparatus and method are provided to generate a three-dimensional model of a warp knit to reproduce a realistic knitting structure. An initial model generation portion (160) generates in a virtual three-dimensional space an initial model of a warp knit representing one column of yarn path in a warp direction and array information representing an array position in a weft direction of one column of yarn path. A position correction portion (170) sets mass points of a yarn on the yarn path, generates a dynamic model of the warp knit by connecting the mass points, and corrects the position of each mass point. A three-dimensional model generation portion (180) forms a surface expressing a yarn surface on a yarn path represented by the edge connected to the mass points whose positions are corrected, and thereby generates a three-dimensional model of the warp knit.

11 Claims, 24 Drawing Sheets

U.S. PATENT DOCUMENTS

| | | | |
|---|---|---|---|
| 6,180,545 B1 * | 1/2001 | Okeya et al. | 442/308 |
| 6,988,386 B1 * | 1/2006 | Okawa et al. | 66/195 |
| 7,386,360 B2 | 6/2008 | Noriyuki | |
| 7,630,591 B2 * | 12/2009 | Allen et al. | 385/12 |
| 2005/0146076 A1 * | 7/2005 | Alexander et al. | 264/257 |
| 2006/0026998 A1 * | 2/2006 | Okawa et al. | 66/195 |
| 2007/0088453 A1 | 4/2007 | Noriyuki | |
| 2009/0119112 A1 | 5/2009 | Imao et al. | |

FOREIGN PATENT DOCUMENTS

| | | |
|---|---|---|
| JP | 2005-120501 | 5/2005 |
| JP | 2006-65573 | 3/2006 |
| JP | 2006-209706 | 8/2006 |
| JP | 2007-293636 | 11/2007 |

OTHER PUBLICATIONS

Levent Onal et al. "Analysis of a Novel 3D Hybrid Woven/Knitted Fabric Structure", published Sep. 2004.*

Yoshida et al., "Development of Simulation Technology for Knitted Fabric Construction", Report of Industrial Technology Center, Fukui Prefecture, Sep. 30, 2003, No. 19, pp. 65-57.

Michael Meissner et al., "The Art of Knitted Fabrics, Realistic & Physically Based Modelling of Knitted Patterns"—Computer Graphics Forum, Sep. 1998, vol. 17, Issue 3, p. 355-362.

Sabit Adanur et al., "3D modeling of textile composite preforms", Composites Part B: Engineering, Nov. 1998, vol. 29, Issue 6, p. 787-793.

Goketepe. O, Harlock. SC, "Three-Dimensional Computer Modeling of Warp Knitted Structures", Textile Research Journal, Mar. 2002.

Baining Guo et al., "Realistic rendering and animation of knitwear"—IEEE Transactions on Visualization and Computer Graphics, vol. 9, No. 1, Jan.-Mar. 2003—pp. 43-55.

Goktepe O et al., "Three-dimensional computer modeling of warp knitted structures"—Textile Research Journal, vol. 72, No. 3, Mar. 2002—pp. 266-272.

* cited by examiner

WEFT DIRECTION

FIG.9B

```
<Yarn Layer="1" Wale="0" Index="1"/>
<Yarn Layer="1" Wale="1" Index="1"/>
<Yarn Layer="1" Wale="2" Index="2"/>
<Yarn Layer="1" Wale="3" Index="3"/>
```

YARN SETTING DATA
RELATIONSHIP BETWEEN YARN ATTRIBUTE DATA CORRESPONDING TO THE POSITION OF YARN IS PROVIDED

FIG.9A

```
<YarnProp Index="0" name="a">
    <Color R="0.5" G="0.2" B="0.1"/>
    ...
</YarnProp>
<YarnProp Index="1" name="b">
    <Color R="1.0" G="0.5" B="0.9"/>
    ...
</YarnProp>
...
```

YARN DATA
INCLUDING RGB VALUE AND VARIOUS CHARACTERISTIC DATA SUCH AS YARN

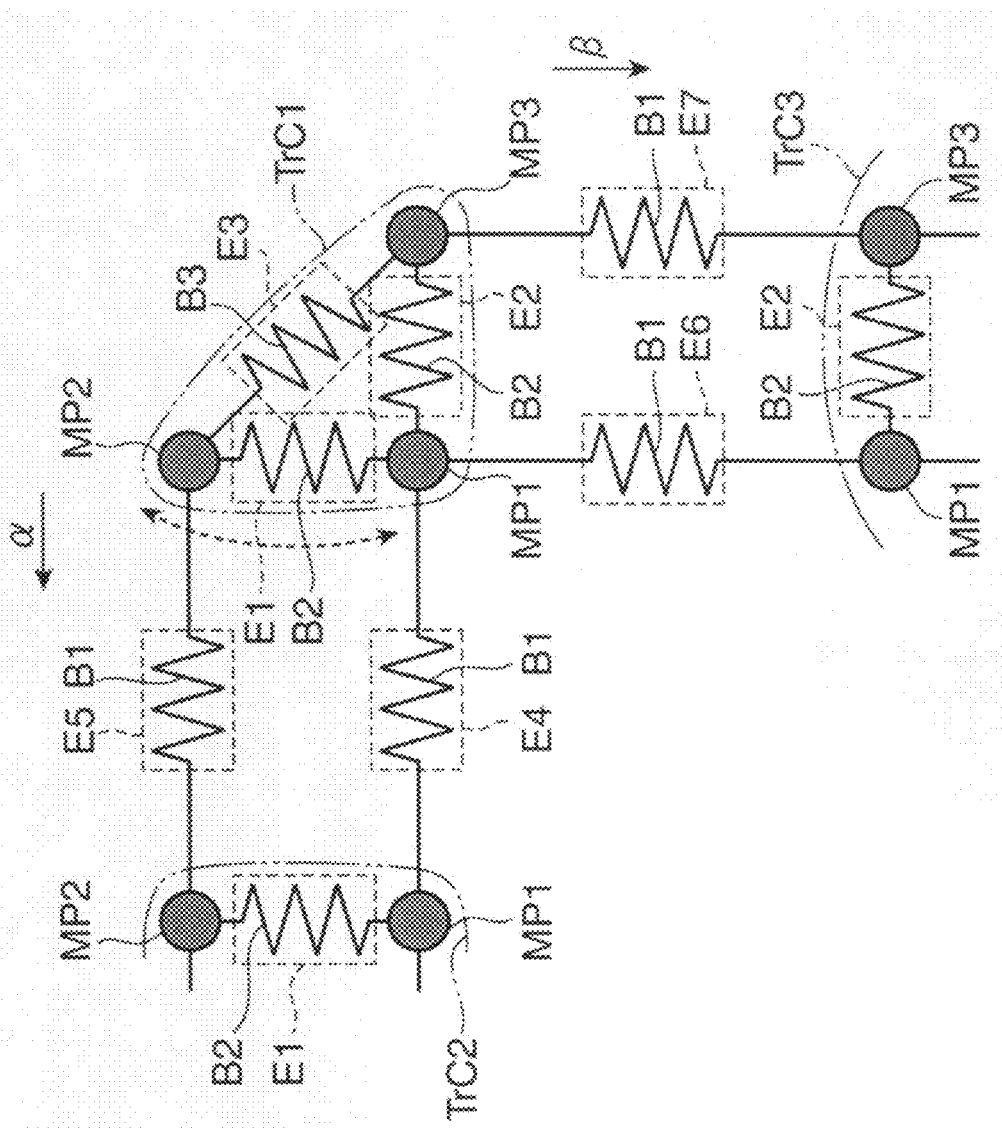
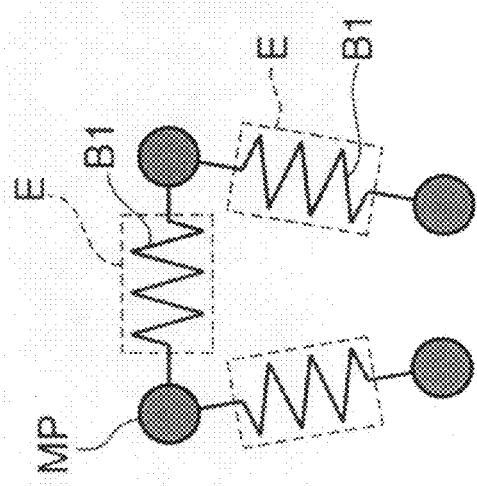

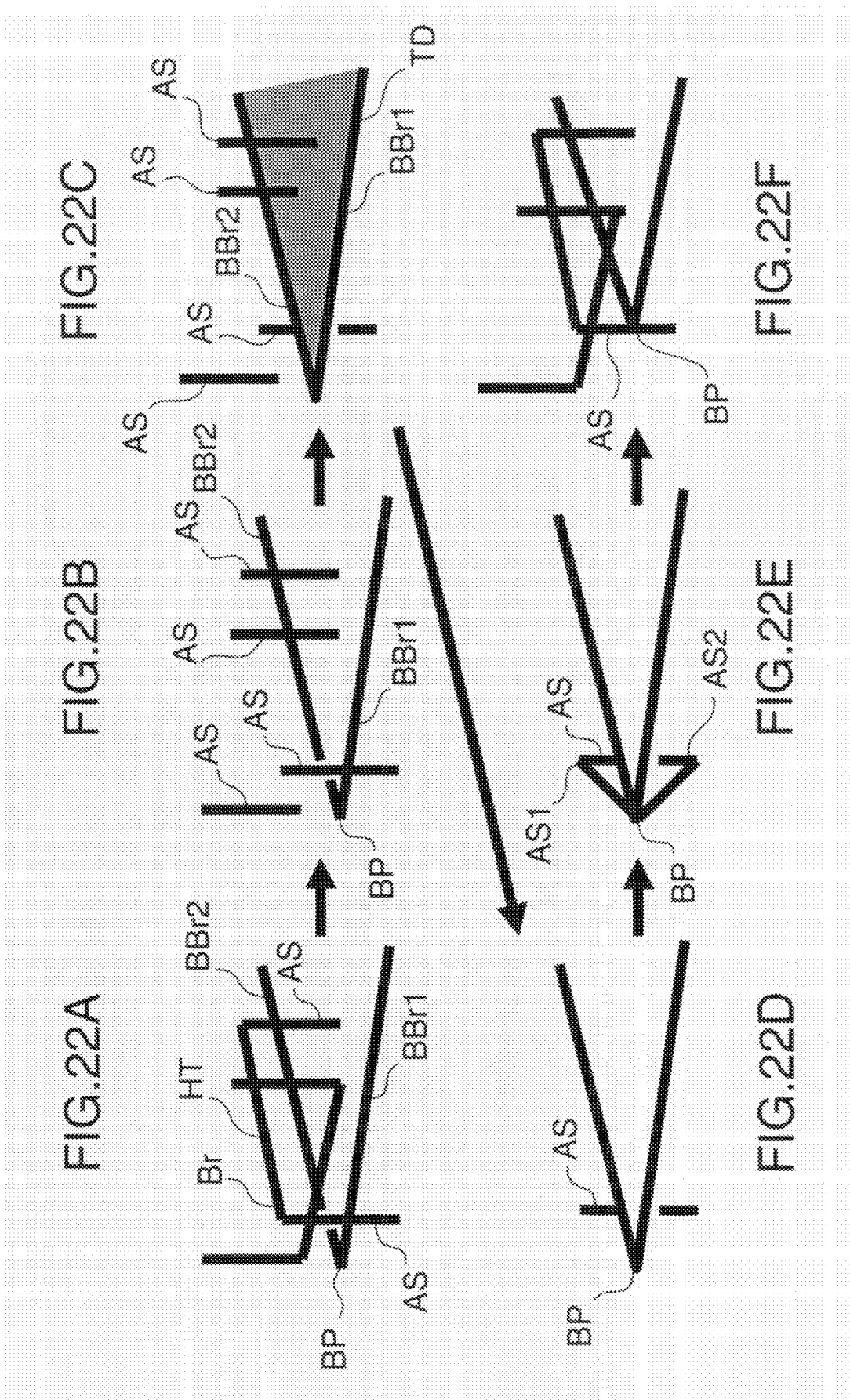

COMPUTER-READABLE RECORDING MEDIUM WHICH STORES KNITTING STRUCTURE MODEL GENERATION PROGRAM, KNITTING STRUCTURE MODEL GENERATION APPARATUS AND KNITTING STRUCTURE MODEL GENERATION METHOD

BACKGROUND OF THE INVENTION

1. Field of the Invention

The present invention relates to a technology for generating a three-dimensional model of a warp-knitted fabric.

2. Description of the Related Art

In recent years, the field of computer graphics has been making an attempt to generate a three-dimensional model of a fabric, such as a woven fabric or knitted fabric, by modeling a fine structure thereof within a virtual three-dimensional space, and simulate a garment by using the three-dimensional model.

Nonpatent Reference 1 (Goketepe. O, Harlock. S C, "Three-Dimensional Computer Modeling of Warp Knitted Structures", Textile Research Journal, March 2002) discloses a technique for generating a three-dimensional model in which the basic shape of a warp-knitted fabric (warp knit) is reproduced three dimensionally by means of NURBS (Non-Uniform Rational B-Spine).

Nonpatent Reference 2 ("Development of Structure Expansion Tool for Warp Knitted Fabric", Masaki Yoshida, http://kouryu.pref.fukui.jp/research/g/jp/sen12.html) discloses an apparatus capable of specifically viewing on a personal computer the finished state of a tricot fabric, raschel fabric or other complicated warp knit, before knitting it with a knitting machine.

However, the problem with the technique disclosed in Nonpatent Reference 1 was that this technique generated a three-dimensional model of a warp knit without taking into consideration the dynamic characteristic of the actual yarns constituting the warp knit, and therefore was not capable of realistically reproducing the structure of the warp knit. Moreover, the technique disclosed in Nonpatent Reference 2 is for generating a two-dimensional model of a warp knit and is not capable of generating a three-dimensional model.

SUMMARY OF THE INVENTION

An object of the present invention is to provide a computer-readable recording medium which stores a knitting structure model generation program, knitting structure model generation apparatus and knitting structure model generation method that are capable of generating a three-dimensional model of a warp knit in which a knitting structure is reproduced realistically.

A computer-readable recording medium which stores a knitting structure model generation program according to the present invention is a knitting structure model generation program for generating a knitting structure model of a warp knit in a virtual three-dimensional space, the program causing a computer to function as: path information acquisition portion for acquiring yarn path information representing a yarn path in a warp direction of the warp knit; an array information acquisition portion for acquiring array information representing an array position in a weft direction of the yarn path represented by the yarn path information; an initial model generation portion for generating in the virtual three-dimensional space an initial model of the warp knit in which the yarn path is expressed in a broken line, in accordance with the yarn path information and the array information; a position correction portion for setting mass points of a yarn in characteristic positions on the yarn path constituting the initial model, generating a dynamic model of the warp knit by connecting the mass points by using an edge applied with a dynamic characteristic of an actual yarn obtained by measuring the actual yarn, and correcting the position of each mass point by solving a motion equation of each mass point; and a three-dimensional model generation portion for forming a surface expressing a yarn surface on a yarn path represented by the edge connected to the mass points whose positions are corrected by the position correction portion, and thereby generating a three-dimensional model of the warp knit.

A knitting structure model generation apparatus according to the present invention is a knitting structure model generation apparatus for generating a knitting structure model of a warp knit in a virtual three-dimensional space, the apparatus having: a path information acquisition portion for acquiring yarn path information representing a yarn path in a warp direction of the warp knit; an array information acquisition portion for acquiring array information representing an array position in a weft direction of the yarn path represented by the yarn path information; an initial model generation portion for generating in the virtual three-dimensional space an initial model of the warp-knitted fabric in which the yarn path is expressed in a broken line, in accordance with the yarn path information and the array information; a position correction portion for setting mass points of a yarn in characteristic positions on the yarn path constituting the initial model, generating a dynamic model of the warp knit by connecting the mass points by using an edge applied with a dynamic characteristic of an actual yarn obtained by measuring the actual yarn, and correcting the position of each mass point by solving a motion equation of each mass point; and a three-dimensional model generation portion for forming a surface expressing a yarn surface on a yarn path represented by the edge connected to the mass points whose positions are corrected by the position correction portion, and thereby generating a three-dimensional model of the warp knit.

A knitting structure model generation method according to the present invention is a knitting structure model generation method for generating a knitting structure model of a warp knit in a virtual three-dimensional space, the method having: a step in which a computer acquires yarn path information representing a yarn path in a warp direction of the warp knit; a step in which the computer acquires array information representing an array position in a weft direction of the yarn path represented by the yarn path information; a step in which the computer generates in the virtual three-dimensional space an initial model of the warp knit in which the yarn path is expressed in a broken line, in accordance with the yarn path information and the array information; a step in which the computer sets mass points of a yarn in characteristic positions on the yarn path constituting the initial model, generating a dynamic model of the warp knit by connecting the mass points by using an edge applied with a dynamic characteristic of an actual yarn obtained by measuring the actual yarn, and correcting the position of each mass point by solving a motion equation of each mass point; and a step in which the computer forms a surface expressing a yarn surface on a yarn path represented by the edge connected to the mass points whose positions are corrected, and thereby generating a three-dimensional model of the warp knit.

According to these configurations, the yarn path information representing a yarn path in a warp direction of a warp knit is acquired, and the array information representing an array position in a weft direction of the yarn path represented by the yarn path information is acquired. Then, an initial model of the warp knit in which the yarn path is expressed in a broken line is generated within a virtual three-dimensional space in accordance with the yarn path represented by the yarn path information and the yarn position represented by the array information. Mass points of a yarn are set in characteristic positions on the yarn path constituting the initial model, and the mass points are connected by using an edge applied with a dynamic characteristic of an actual yarn that is obtained by measuring the actual yarn, whereby a dynamic model of the warp knit is generated. The position of each mass point is corrected by solving a motion equation of each mass point, and a surface expressing a yarn surface is formed on the yarn path represented by the edge connected to the mass points whose positions are corrected, whereby a three-dimensional model of the warp knit is generated.

Specifically, because the dynamic characteristic of the actual yarn is incorporated in the motion equations and the three-dimensional model of the warp knit is generated by solving the motion equations, the three-dimensional model of the warp knit in which the knitting structure is reproduced realistically can be generated.

BRIEF DESCRIPTION OF THE DRAWINGS

FIG. 5 is a diagram showing a data structure of yarn path information of a normal lap;

FIG. 7 is a diagram showing a data structure of array information;

FIG. 9 is a diagram showing a data structure of yarn information;

FIG. 18 is an explanatory diagram showing a dynamic model, wherein (A) shows a coarse dynamic model and (B) shows a dense dynamic model;

FIG. 22 is an explanatory diagram showing a processing for connecting the blind lap and the normal lap to each other, wherein the processing proceeds in order of (A) to (F);

DETAILED DESCRIPTION OF THE PREFERRED EMBODIMENTS

Figure 1:
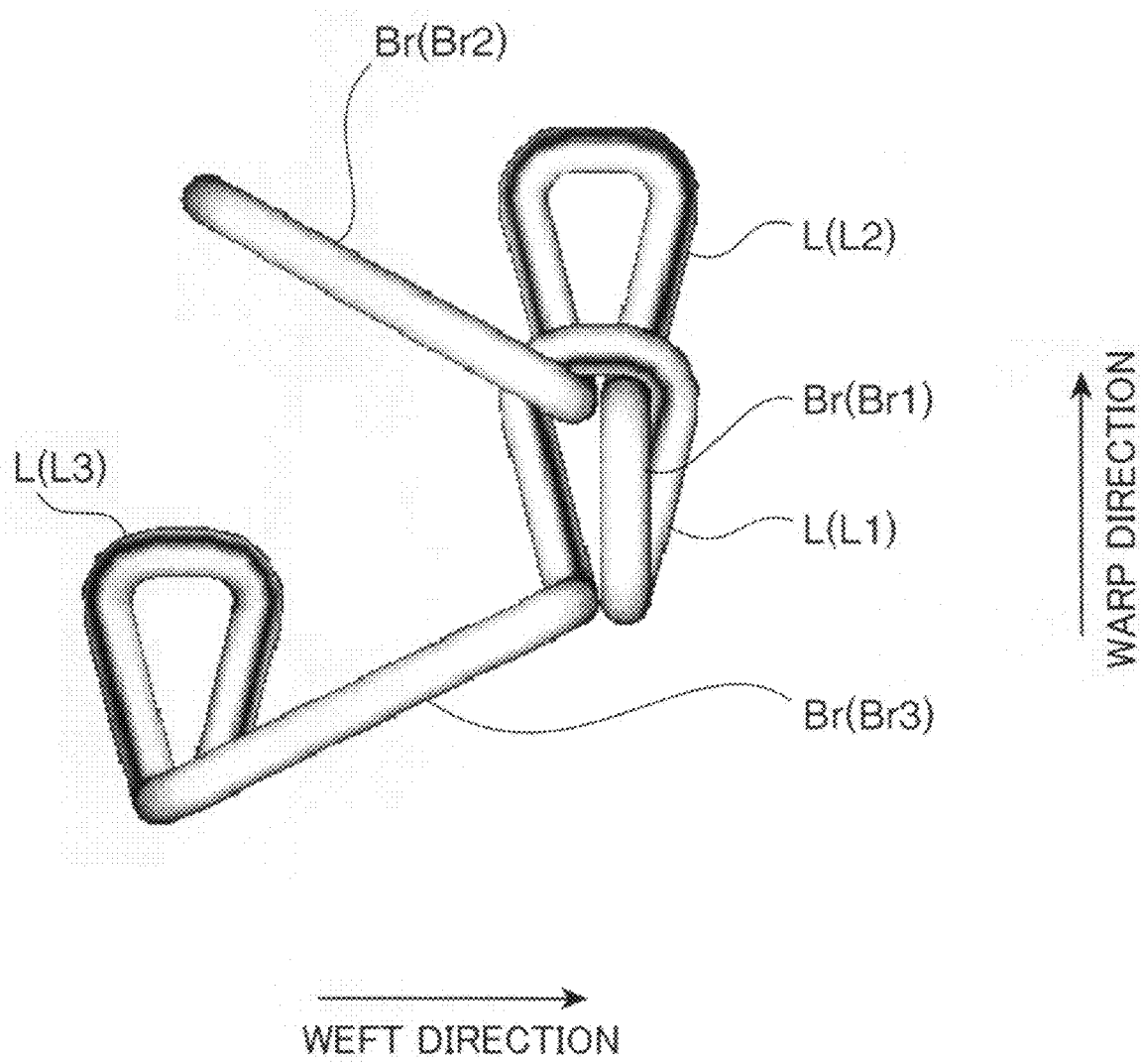
FIG. 1 is a diagram showing a knitting structure of an actual warp knit which is the target of modeling performed by the present knitting structure model generation apparatus.

FIG. 1 is a diagram showing a knitting structure of an actual warp knit which is the target of modeling performed by the present knitting structure model generation apparatus. As shown in FIG. 1, the warp knit is configured by substantially U-shaped loops L (L1 to L3) and substantially U-shaped bridges Br (Br1 to Br3) connecting the loops. In the warp knit shown in FIG. 1, the bridge Br1 extending from a right end of the loop L1 runs inside the loop L1 and is connected to the loop L2 positioned above the loop L1. The bridge Br3 extending from a left end of the loop L1 is connected to a left end of the loop L3 positioned obliquely downward to the left from the loop L1. The bridge Br2 extending from a left end of the loop L2 is connected to a loop (not shown) positioned obliquely upward to the left from the loop L2.

Figure 2:
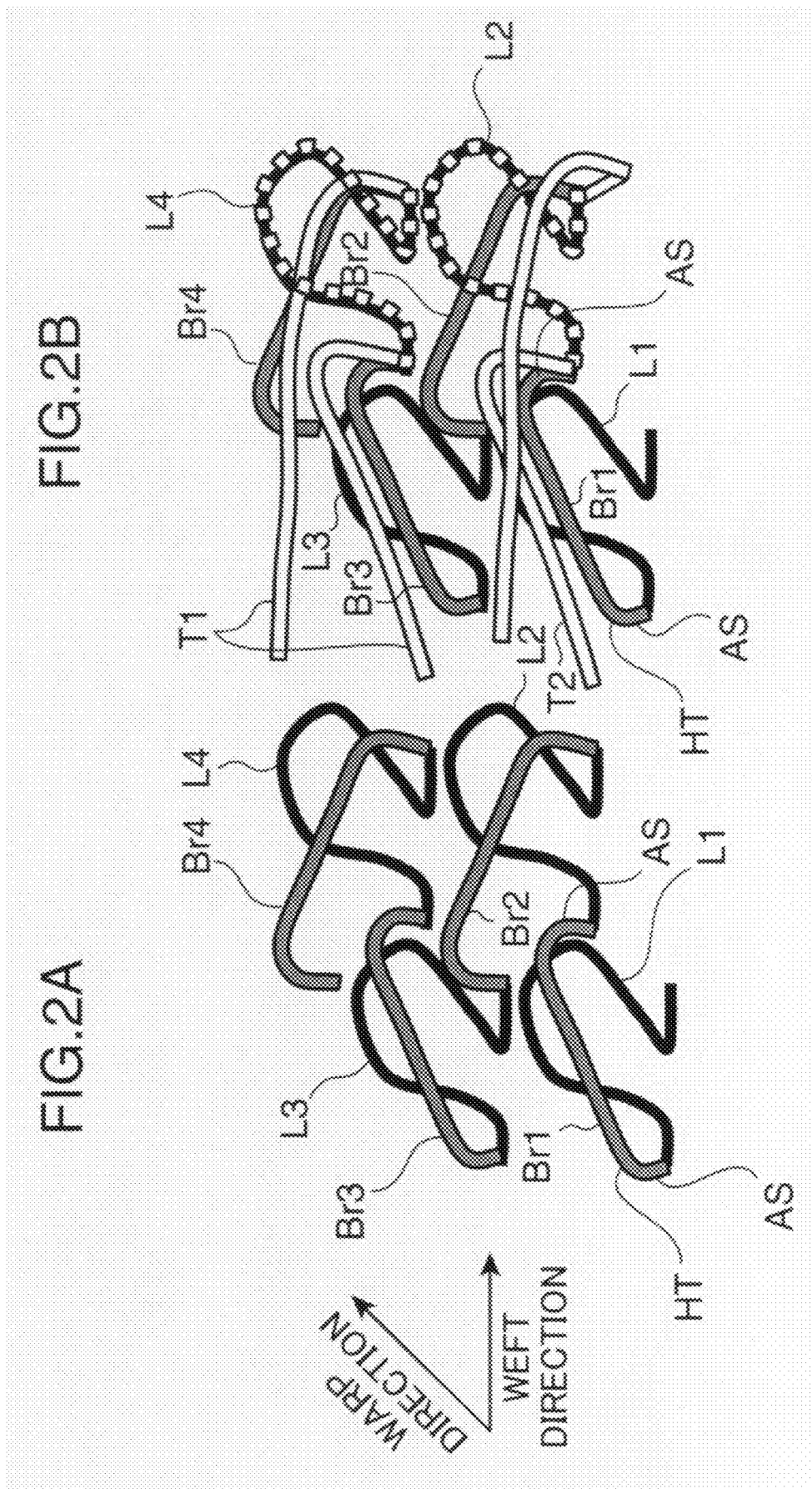
FIG. 2 is a schematic diagram showing a sterical knitting structure of a warp knit to be generated by the knitting structure model generation apparatus, wherein (A) shows a knitting structure of the warp knit having a single-sided multi-layer structure called "tricot" and (B) shows a knitting structure of a two-layer structure tricot.

FIG. 2 is a schematic diagram showing a sterical knitting structure of a warp knit to be generated by the knitting structure model generation apparatus, wherein (A) shows a knitting structure of the warp knit having a single-sided multi-layer structure called "tricot" and (B) shows a knitting structure of a two-layer structure tricot. As shown in FIGS. 2(A) and (B), loops L1 to L4 are arrayed parallel to a horizontal plane, and bridges Br1 to Br4 are each configured by two leg parts AS extending substantially perpendicularly to the horizontal plane, and a ceiling part HT that connects upper ends of the two leg parts AS in a direction substantially parallel to the horizontal plane.

The loops L1 to L4 shown in FIGS. 2(A) and (B) are arrayed continuously in a warp direction while shifting in zigzags in a weft direction. The bridge Br1 connects the loops L1 and L2 to each other. The bridge Br2 connects the loops L2 and L3 to each other. The bridge Br3 connects the loops L3 and L4 to each other.

The warp knit shown in FIG. 2(B) has a structure in which two warp-knitted layers made of tricot are stacked together. In the warp knit shown in FIG. 2(B), a yarn T1, unshown, which extends from one of the warp-knitted layers overlaps with the loop L4 configuring the other unshown warp-knitted layer, while a yarn T2 extending from the former warp-knitted layer overlaps with the loop L2 configuring the other warp-knitted layer, whereby the two warp-knitted layers are coupled to each other.

Figure 3:
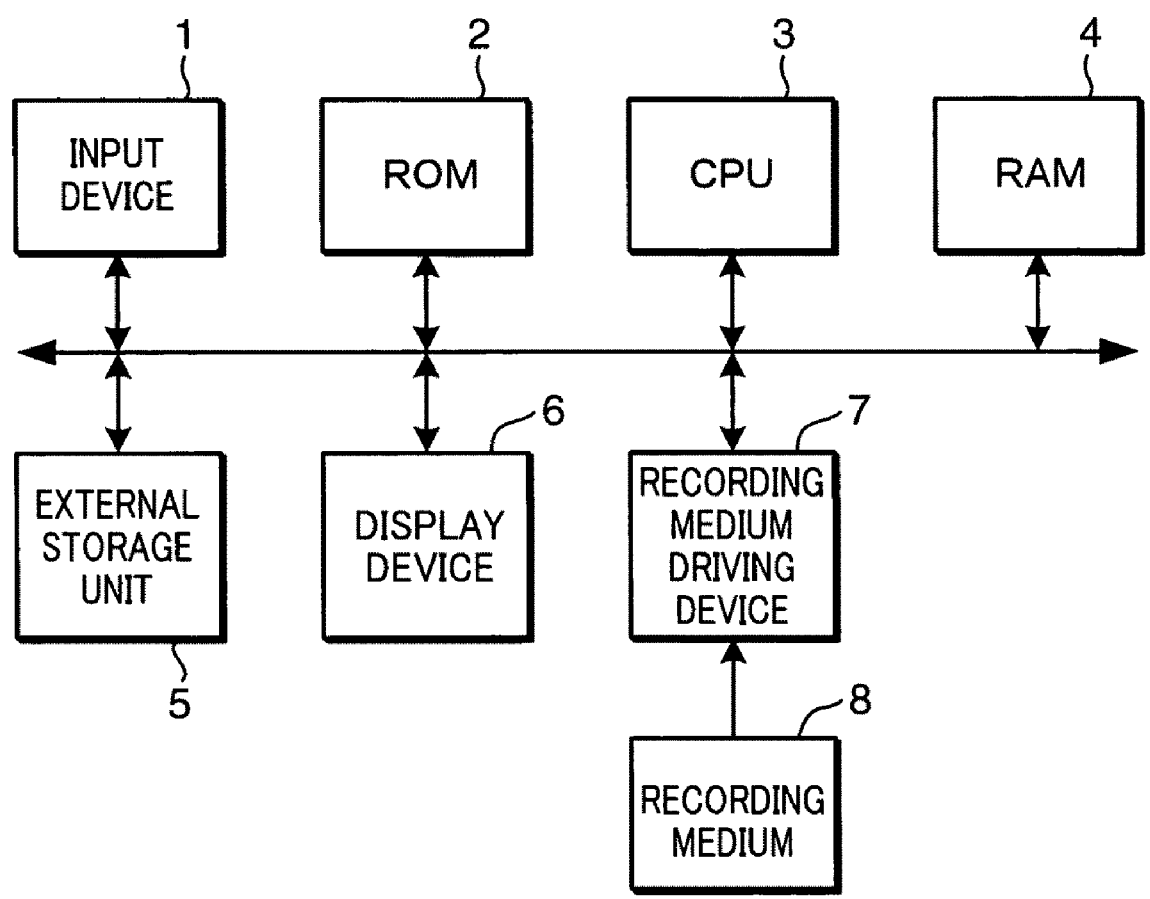
FIG. 3 is a block diagram showing a hardware configuration of the knitting structure model generation apparatus according to an embodiment of the present invention.

FIG. 3 is a block diagram showing a hardware configuration of the knitting structure model generation apparatus according to an embodiment of the present invention. This knitting structure model generation apparatus is configured by a normal computer or the like and has an input device 1, ROM (read-only memory) 2, CPU (central processing unit) 3, RAM (random access memory) 4, external storage unit 5, display device 6, and recording medium driving device 7. Each block is connected to an internal bus, via which various data items are input/output, and various processes are executed under the control of the CPU 3.

The input device 1 is configured by a keyboard, mouse, and the like, and is used by a user to input various data items. The ROM 2 stores a system program such as a BIOS (Basic Input/Output System) and the like. The external storage unit 5 is configured by a hard disk drive and the like and stores a predetermined OS (Operating System), a knitting structure model generation program, and the like. The CPU 3 reads the OS and the like from the external storage unit 5 and controls the operation of each block. The RAM 4 is used as a work area of the CPU 3.

The display device 6 is configured by a liquid display device or the like and displays various images under the control of the CPU 3. The recording medium driving device 7 is configured by a CD-ROM drive, flexible disk drive and the like.

Note that the knitting structure model generation program is stored in a computer-readable recording medium 8, such as a CD-ROM, and distributed to the market. The user causes the recording medium driving device 7 to read this recording medium 8 to install the knitting structure model generation program on the computer. Moreover, the knitting structure model generation program may be installed on the computer by storing the knitting structure model generation program in a server on the internet and then downloading the knitting structure model generation program from the server.

Figure 4:
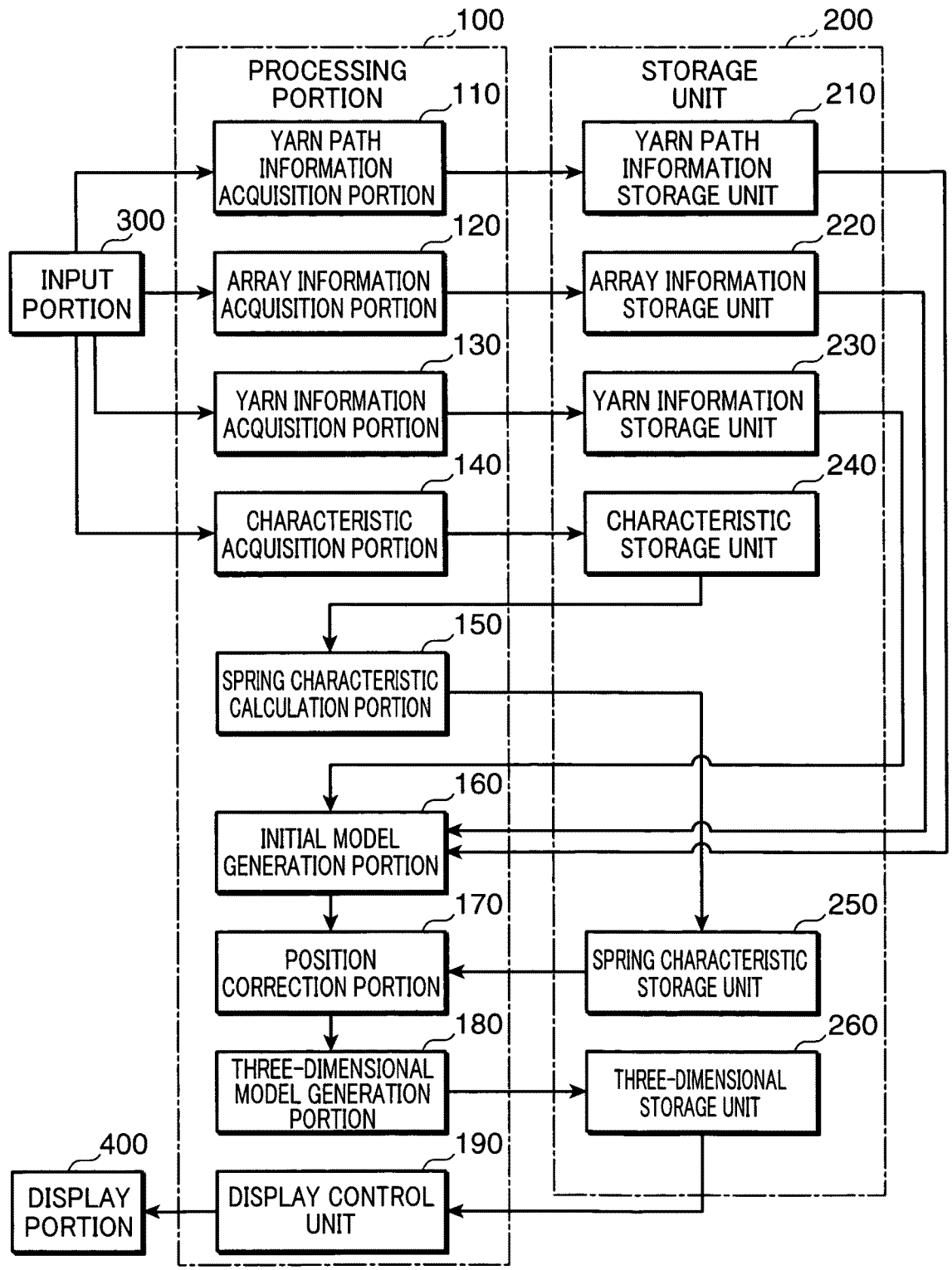
FIG. 4 is a functional block diagram of the knitting structure model generation apparatus shown in FIG. 3.

FIG. 4 is a functional block diagram of the knitting structure model generation apparatus shown in FIG. 3. The knitting structure model generation apparatus has a processing unit 100, storage unit 200, input portion 300 and display portion 400. The processing unit 100 is configured by the CPU 3 and has functions such as a path information acquisition portion 110, array information acquisition portion 120, yarn information acquisition portion (color information acquisition part) 130, characteristic acquisition portion 140, spring characteristic calculation portion 150, initial model generation portion 160, position correction portion 170, three-dimensional model generation portion 180, and display control unit 190. These functions are realized by the CPU 3 executing the knitting structure model generation program.

Figure 16:
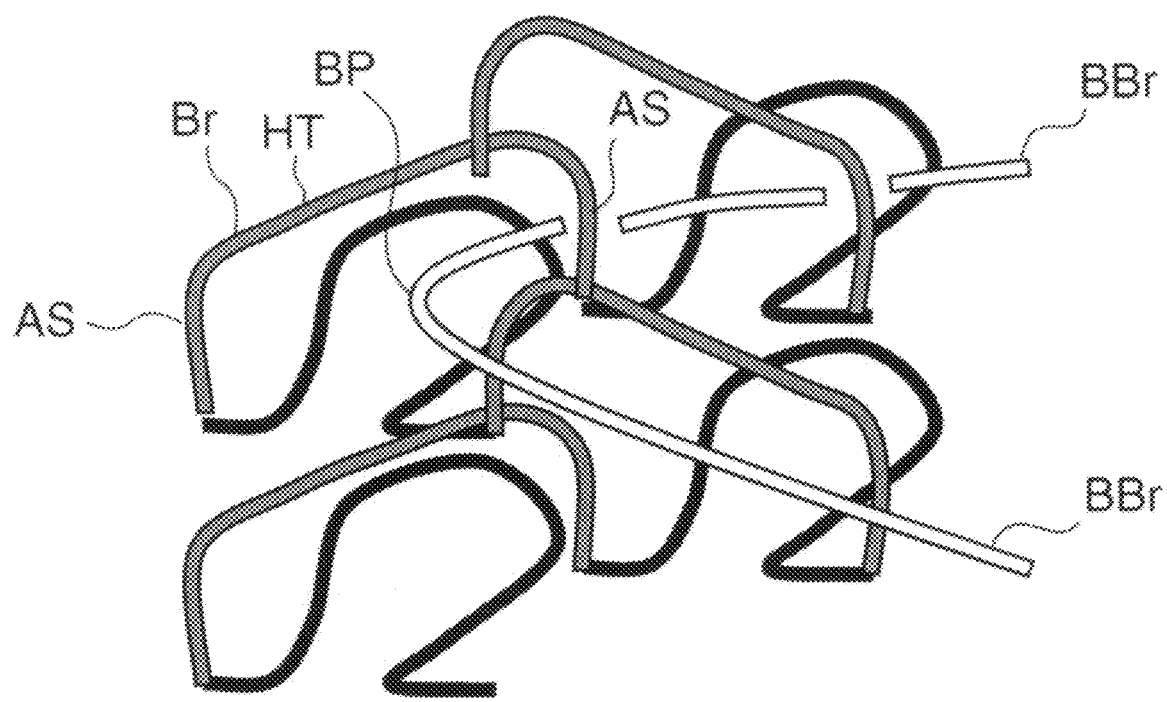
FIG. 16 is a schematic diagram of a sterical knitting structure of a blind lap.

The path information acquisition portion 110 acquires yarn path information representing one column of yarn path in a warp direction of a warp knit, which is the target of modeling, in accordance with an operation input of the user received by the input portion 300. In this embodiment, the yarn path has a normal lap and a blind lap. The normal lap is configured by a plurality of loops L1 arrayed at certain intervals in the warp direction, and the bridges Br connecting the loops while meandering in the direction of the yarn path, as shown in FIGS. 1 and 2. The blind lap is configured such that the bridges Br of the normal lap without the two leg parts AS are connected together while meandering in the warp direction without passing through the loop L. FIG. 16 is a schematic diagram of a sterical knitting structure of the blind lap. As shown in FIG. 16, the blind lap has a yarn path in which a connection point BP between the bridges BBr configuring the blind lap is caught between the leg parts AS of the bridge Br of the normal lap.

FIG. 5 is a diagram showing a data structure of yarn path information of the normal lap. The yarn path information shown in FIG. 5 represents yarn path information of the warp knit configured by four warp-knitted layers stacked in a height direction perpendicular to the warp direction and the weft direction.

A data group enclosed by a tag "<L0>" described in the first line represents the yarn path information of one column of yarn path running in the warp direction of the lowermost layer (the $L0^{th}$ layer) of the warp knit. A data group enclosed by a tag "<L1>" described in the second line represents the yarn path information of one column of yarn path running in the warp direction of the $L1^{st}$ layer above the $L0^{th}$ layer. A data group enclosed by a tag "<L2>" described in the third line represents the yarn path information of one column of yarn path running in the warp direction of the $L2^{nd}$ layer above the $L1^{st}$ layer. A data group enclosed by a tag "<L3>" described in the fourth line represents the yarn path information of one column of yarn path running in the warp direction of the $L3^{rd}$ layer above the $L2^{nd}$ layer.

Figure 6:
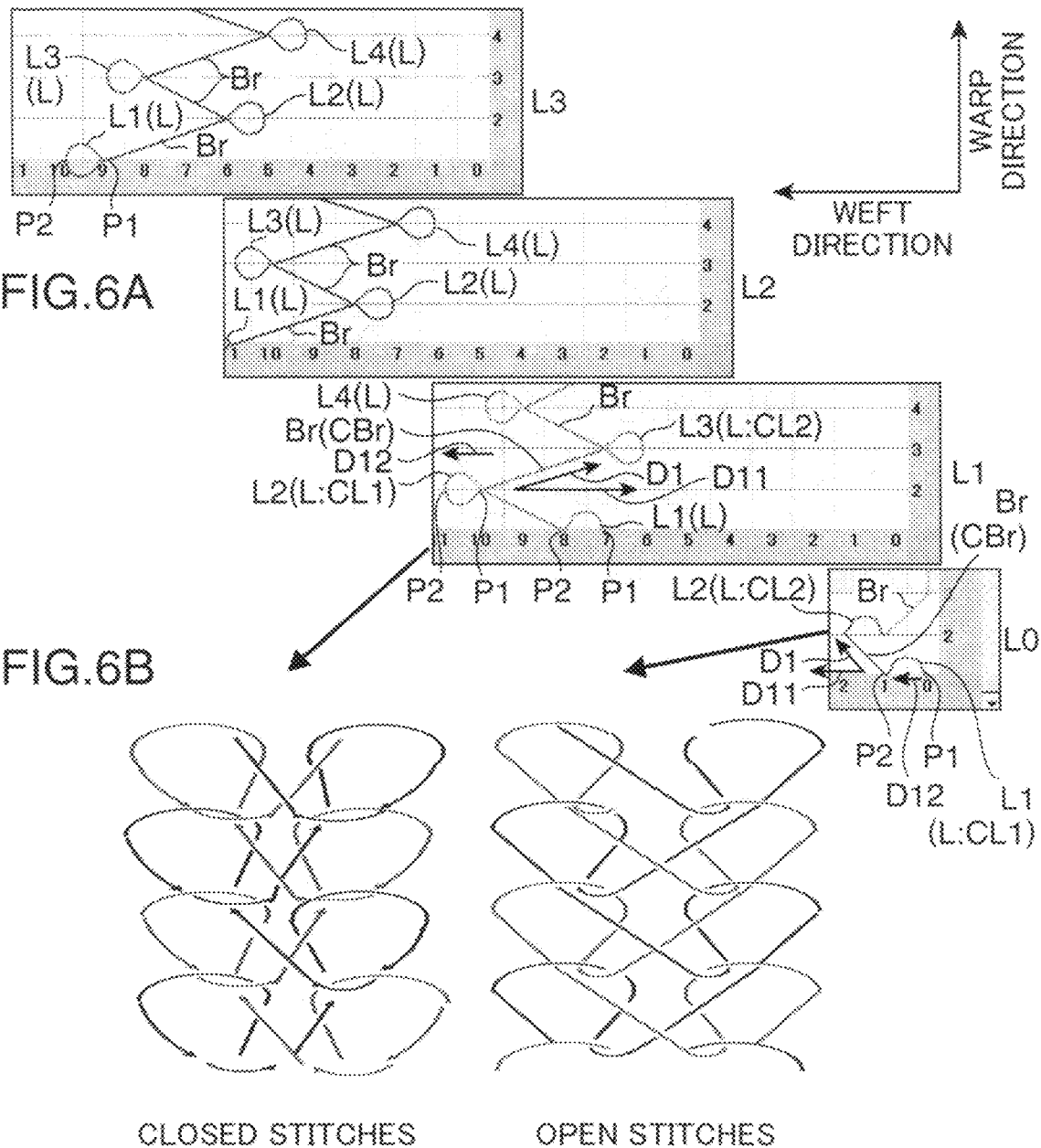
FIG. 6 is an explanatory diagram of the yarn path information, wherein (A) shows L0 to L3 that simply show yarn paths represented by $L0^{th}$ to $L3^{rd}$ yarn path information shown in FIG. 5 and (B) shows closed stitches and open stitches.
Figure 8B:
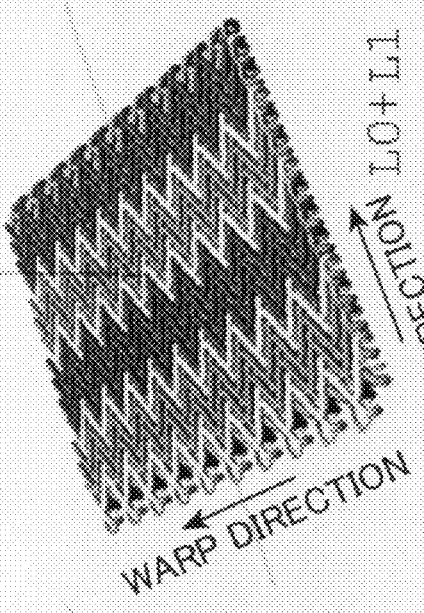
FIG. 8 is a diagram showing a three-dimensional model of a warp knit composed of yarn paths that are arrayed according to the yarn path information shown in FIG. 5 and the array information shown in FIG. 7.
Figure 8D:
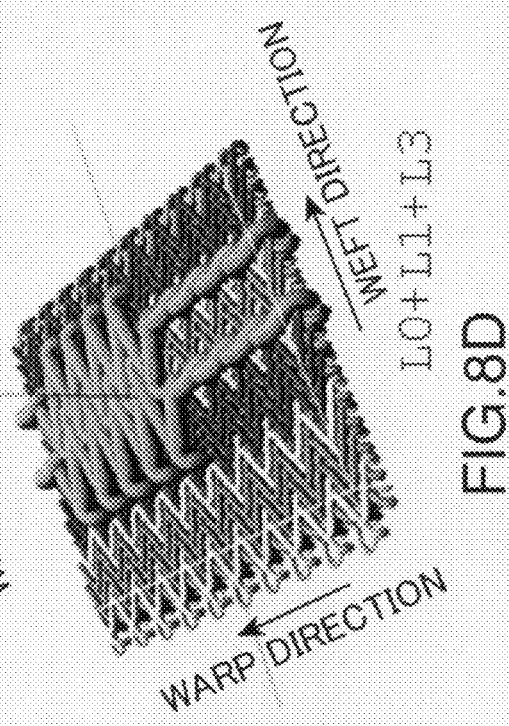
Figure 8A:
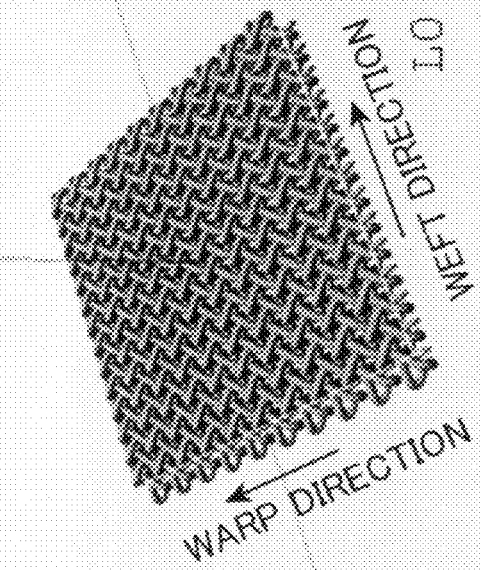
Figure 8C:
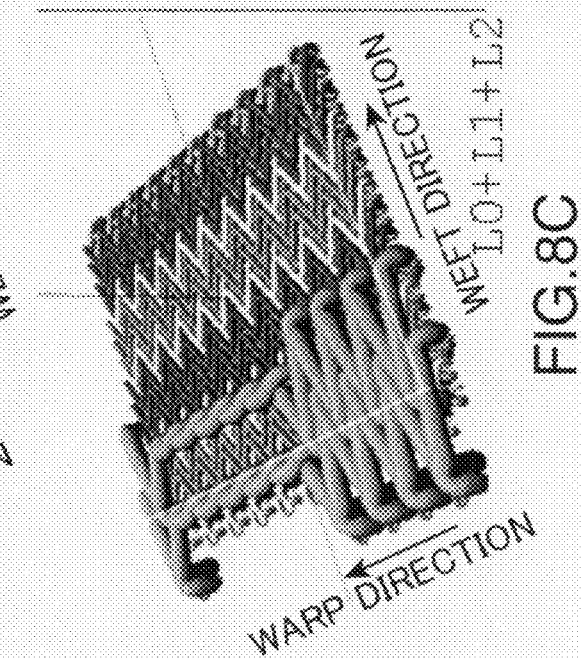

FIG. 6 is an explanatory diagram of the yarn path information, wherein (A) simply shows yarn paths represented by the $L0^{th}$ to $L3^{rd}$ yarn path information shown in FIG. 5 and (B) shows closed stitches and open stitches. In L0 to L3 shown in FIG. 6(A), the scales in the weft direction represent weft direction coordinates, and the scales in the warp direction represent warp direction coordinates.

As shown in FIG. 6(A), one column of yarn path of the normal lap configuring each warp-knitted layer is configured by the plurality of loops L arrayed at certain intervals in the warp direction, and the bridges Br connecting the loops L while meandering in the direction of the yarn path. The yarn path information of the normal lap represents one column of yarn path by arraying first and second positional data representing the positions of first and second end points P1 and P2 in the weft direction, in accordance with a yarn path direction D1, the end points being two end points on each of the loops L configuring one column of yarn path. Here, the yarn path direction D1 is oriented in a direction where the bridges Br are oriented in the warp direction.

Here, the first end point P1 is located on the upstream side of the yarn path direction D1 from the second end point P2, and represents an end point of a right end or left end in the weft direction of the loop L1. The second end point P2 is located on the downstream side of the yarn path direction D1 from the first end point P1 and represents an end point of the right end or left end in the weft direction of the loop L1. The yarn path information represents the smallest unit of one column of yarn path in the warp direction, and the one column of yarn path is represented by circulating the yarn path information in the warp direction a predetermined number of times in accordance with the width of the warp direction of the warp knit.

The yarn path information of the $L0^{th}$ layer of the yarn path information of the normal lap shown in FIG. 5 has "0, 1" arrayed therein, and this indicates that the first and second positional data of the loop L1 located in the uppermost stream of the yarn path direction D1 are "0" and "1," as shown in FIG. 6. The yarn path information of the $L0^{th}$ layer has "2, 1" arrayed therein subsequent to "0, 1," and this indicates that the first and second positional data of the loop L2 subsequent to the loop L on the uppermost stream are "2" and "1."

Note that in the present embodiment an interval between the adjacent loops L in the warp direction is set at the length of one scale in the warp direction shown in FIG. 6. Therefore, in the $L0^{th}$ yarn path, the interval between the loop L1 and the loop L2 in the warp direction, that is, the length of the bridge Br connecting the loop L1 and the loop L2 in the warp direction, is the length of one scale in the warp direction shown in FIG. 6.

In the yarn path information shown in FIG. 5, the yarn path information of the $L1^{st}$ layer is composed of "7, 8," "10, 11," "7, 6," and "9, 10," which indicates that the loops L1 to L4 having "7, 8," "10, 11," "7, 6," and "9, 10" as the first and second positional data are arrayed in this order in the yarn path direction D1, as shown in FIG. 6.

In addition, in the yarn path information shown in FIG. 5, the yarn path information of the $L2^{nd}$ layer is composed of "11, 12," "8, 7," "10, 11," and "7, 6," which indicates that the loops L1 to L4 having "11, 12," "8, 7," "10, 11," and "7, 6" as the first and second positional data are arrayed in this order in the yarn path direction D1, as shown in FIG. 6.

Moreover, in the yarn path information shown in FIG. 5, the yarn path information of the $L3^{rd}$ layer is composed of "9, 10," "6, 5," "8, 9," and "5, 4," which indicates that the loops L1 to L4 having "9, 10," "6, 5," "8, 9," and "5, 4" as the first and second positional data are arrayed in this order in the yarn path direction D1, as shown in FIG. 6.

As shown by the L0 in FIG. 6(A), the yarn path information sets a first loop CL1 as an open stitch, when a yarn path direction D11 in the weft direction of a target bridge CBr that connects the target first loop CL1 and a second loop CL2 that is positioned on the downstream side of the yarn path direction from the first loop CL1 is same as a vector direction D12 directed from the first end point P1 to the second end point P2.

On the other hand, as shown by the L1 in FIG. 6(A), the yarn path information sets the first loop CL1 as a closed stitch, when the yarn path direction D11 in the weft direction of the target bridge CBr that connects the target first loop CL1 and the second loop CL2 positioned on the downstream side of the yarn path direction D1 from the first loop CL1 is opposite from the vector direction D12 directed from the first end point P1 to the second end point P2.

The yarn path information of the blind lap represents one column of yarn path by arraying, along the yarn path direction D1, the positional data representing the positions in the weft direction of the connection points BP between the bridges BBr configuring the blind lap. Specifically, the yarn path information of the blind lap is represented by representing the positional data of the connection point BP by means of the first and second positional data having the same value, and arraying the first and second positional data in accordance with the yarn path direction D1. For example, in the blind lap having the yarn path information of "3, 3; 6, 6; 4, 4; 7, 7," the positions of the connection points BP in the weft direction are "3," "6," "4," "7," and the connection points BP are connected by the bridge BBr in this order.

The array information acquisition portion 120 shown in FIG. 4 acquires array information representing an array position in the weft direction of one column of yarn path in accordance with an operation input of the user received by the input portion 300, and stores the array information in an array information storage unit 220. Here, the array information represents an array position in the weft direction of each warp-knitted layer of one column of yarn path, the array position being represented by the yarn path information. FIG. 7 is a diagram showing a data structure of the array information. The array information shown in FIG. 7 represents array information of a warp knit configured by four warp-knitted layers stacked in the height direction perpendicular to the warp direction and the weft direction.

In FIG. 7, one line of data group enclosed by a tag "<L0>" described in the first line represents the array information of the lowermost layer (the $L0^{th}$ layer) of the warp knit. One line of data group enclosed by a tag "<L1>" described in the second line represents the array information of the $L1^{st}$ layer above the $L0^{th}$ layer. One line of data group enclosed by a tag "<L2>" described in the third line represents the array information of the $L2^{nd}$ layer above the $L1^{st}$ layer. One line of data group enclosed by a tag "<L3>" described in the fourth line represents the array information of the $L3^{rd}$ layer above the $L2^{nd}$ layer.

In FIG. 7, each column represents the positions in the weft direction. For example, the first column represents the position where the coordinate is "0" in the weft direction. In FIG. 7, according to the array information of the $L0^{th}$ layer, because the $1^{st}$ to $22^{nd}$ data columns are all "1," a yarn path represented by the yarn path information of the $L0^{th}$ layer is arrayed in the positions where the coordinates in the weft direction of the $L0^{th}$ layer are "0" to "21."

In FIG. 7, according to the array information of the $L1^{st}$ layer, because the $1^{st}$ to $22^{nd}$ data columns are all "1," one column of yarn path represented by the yarn path information of the $L1^{st}$ layer is arrayed in the positions where the coordinates in the weft direction of the $L1^{st}$ layer are "0" to "21." Also, because $2^{nd}$ and $7^{th}$ columns of the array information of the $L2^{nd}$ layer are "1," one column of yarn path represented by the yarn path information of the $L2^{nd}$ layer is arrayed in the position where the coordinates in the weft direction of the $L2^{nd}$ layer are "1" and "6." Furthermore, in FIG. 7, because the $14^{th}$ and $19^{th}$ columns of the array information of the $L3^{rd}$ layer are "1," one column of yarn path represented by the yarn path information of the $L3^{rd}$ layer is arrayed in the position where the coordinates in the weft direction of the $L3^{rd}$ layer are "13" and "18."

FIG. 8 is a diagram showing a three-dimensional model of a warp knit constituted by yarn paths that are arrayed according to the yarn path information shown in FIG. 5 and the array information shown in FIG. 7. The three-dimensional model shown in FIG. 8(A) is obtained by arraying one column of yarn path represented by the yarn path information of the $L0^{th}$ layer shown in FIG. 5 in accordance with the array information of the $L0^{th}$ layer shown in FIG. 7. The three-dimensional model shown in FIG. 8(B) is obtained by arraying one column of yarn path represented by the yarn path information of the $L1^{st}$ layer shown in FIG. 5 in accordance with the array information of the $L1^{st}$ layer shown in FIG. 7, and then stacking the $L0^{th}$ layer and the $L1^{st}$ layer together. The three-dimensional model shown in FIG. 8(C) is obtained by arraying one column of yarn path represented by the yarn path information of the L$2^{nd}$ layer shown in FIG. 5 in accordance with the array information of the L$2^{nd}$ layer shown in FIG. 7, and then stacking the L$0^{th}$ layer to the L$2^{nd}$ layer together. The three-dimensional model shown in FIG. 8(D) is obtained by arraying one column of yarn path represented by the yarn path information of the L$3^{rd}$ layer shown in FIG. 5 in accordance with the array information of the L$3^{rd}$ layer shown in FIG. 7, and then stacking the L$0^{th}$ layer to the L$3^{rd}$ layer together.

Note that the scale width of the coordinates in the weft direction in the yarn path information shown in FIG. 6(A) is same as the scale width of the coordinates in the weft direction in the array information shown in FIG. 7, and that the coordinates in the weft direction shown in FIG. 6(A) represent relative positions in the weft direction in the array information shown in FIG. 7.

For example, when a yarn path represented by the yarn path information shown in FIG. 6(A) is arrayed in the position where the coordinate in the weft direction of the coordinate system of the array information is "3," the yarn path is arrayed such that the position where the coordinate in the weft direction of the coordinate system of the yarn path information shown in FIG. 6(A) is "0" is placed in the position where the coordinate in the weft direction of the coordinate system of the yarn path information shown in FIG. 6(A) is "3." In this case, the position where the coordinate in the weft direction of the coordinate system of the yarn path information shown in FIG. 6(A) is "1" is disposed in the position where the coordinate in the weft direction of the coordinate system of the array information is "4 (=3+1)." Note that the coordinate in the warp direction in the coordinate system of the yarn path information represents the position same as that of the coordinate in the warp direction in the coordinate system of the array information.

Returning to FIG. 4, the yarn information acquisition portion 130 acquires yarn information representing the colors of yarns configuring the warp knit in accordance with the operation input of the user received by the input portion 300. FIG. 9 is a diagram showing a data structure of yarn information. The yarn information has yarn definition information shown in FIG. 9(A) and color placement information shown in FIG. 9(B).

The yarn definition information has index data, yarn name data, and color component data. The index data is the data consisting of numeric values provided uniquely to each yarn in order to identify the yarn defined by the yarn definition information. The index data is stored in a variable "Index" shown in FIG. 9(A). In the yarn definition information shown in FIG. 9(A), two types of yarns having "0" and "1" as the index data are defined.

The yarn name data is the data representing the name of each yarn defined by the yarn definition information and stored in a variable "name" shown in FIG. 9(A). In the yarn definition information shown in FIG. 9(A), a name "a" is provided to the yarn having "0" as the index data, and a name "b" is provided to the yarn having "1" as the index data.

The color component data is the data that represents color components with an RGB color system, the color components configuring the colors of the yarns defined by the yarn definition information. The color component data is defined by a tag "Color" shown in FIG. 9(A). In the yarn definition information shown in FIG. 9(A), color components of "R=0.5," "G=0.2," and "B=0.1" are defined for the yarn having "0" as the index data, and color components of "R=1.0," "G=0.5," and "B=0.9" are defined for the yarn having "1" as the index data.

The color placement information has layer information, wale information, and index data. The layer information represents the warp-knitted layers and is stored in a variable "Layer" shown in FIG. 9(B). The wale information represents the array positions of the yarns in the weft direction and is stored in a variable "Wale" shown in FIG. 9(B). The index data is the same as the index data of the yarn definition information and stored in a variable "Index" shown in FIG. 9(B).

The first line in FIG. 9(B) describes Layer=1, Wale=0, and Index=1, which indicates that the color and the like of the yarn path that is arrayed in the position where the coordinates of the L$1^{st}$ layer in the weft direction are "0" are defined in the index data=1 of the yarn definition information. Also, the third line in FIG. 9(B) describes Layer=1, Wale=2, and Index=2, which indicates that the color and the like of the yarn path that is arrayed in the position where the coordinates of the L$1^{st}$ layer in the weft direction are "2" are defined in the index data=2 of the yarn definition information.

Returning to FIG. 4, the characteristic acquisition portion 140 acquires the dynamic characteristic of the actual yarn that is obtained by measuring the actual yarn, in accordance with the operation input of the user received by the input portion 300, and stores the dynamic characteristic in a characteristic storage unit 240. Here, the dynamic characteristic includes an elongation characteristic of a yarn that represent the relationship between the tension applied to a yarn and the elongation of the yarn obtained from the tension, a yarn diameter characteristic representing the relationship between the tension applied to a yarn and the yarn diameter resulting from the tension, and an intersection elongation characteristic representing the relationship between the tension applied to yarns at an intersecting point therebetween and the yarn diameter resulting from the tension.

Figure 10:
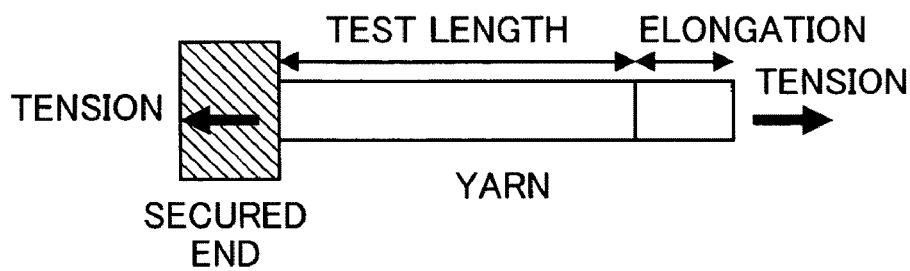
FIG. 10 is an explanatory diagram showing an elongation characteristic.
Figure 11:
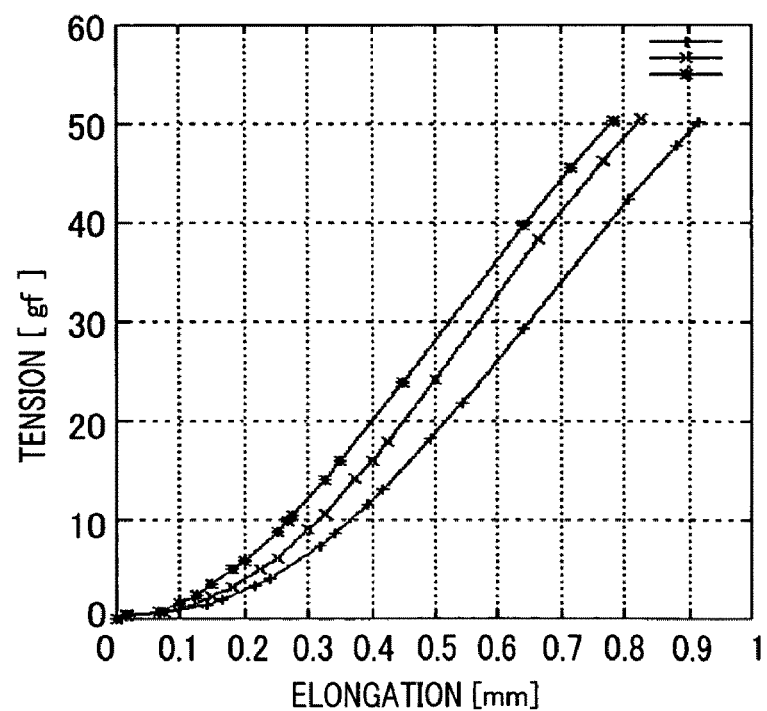
FIG. 11 is a graph showing a measurement result obtained when measuring the elongation characteristic of an actual yarn by using the technique shown in FIG. 10.

FIG. 10 is an explanatory diagram showing the elongation characteristic. The elongation characteristic are obtained by securing one end of a yarn and pulling the other end of the same by means of a tension tester, to measure a tension applied to the yarn and the elongation of the yarn. FIG. 11 is a graph showing a measurement result obtained when measuring the elongation characteristic of the actual yarn by using the technique shown in FIG. 10. The elongation characteristic shown in FIG. 11 is obtained by measuring the tension and the elongation of the yarn by applying a tension of 0 gf to 5 gf to three types of 20-mm yarns at an elongation speed of 10 mm/min. Note that the vertical axis in FIG. 11 represents the tension and the horizontal axis represents the elongation (degree of elongation) of the yarn. As shown in FIG. 11, although the elongation characteristic increases in a downward convex curve in a region where 10 gf or lower tension is applied, the elongation characteristic increases at substantially a constant rate in a region where a tension of 10 gf or more is applied.

Figure 12:
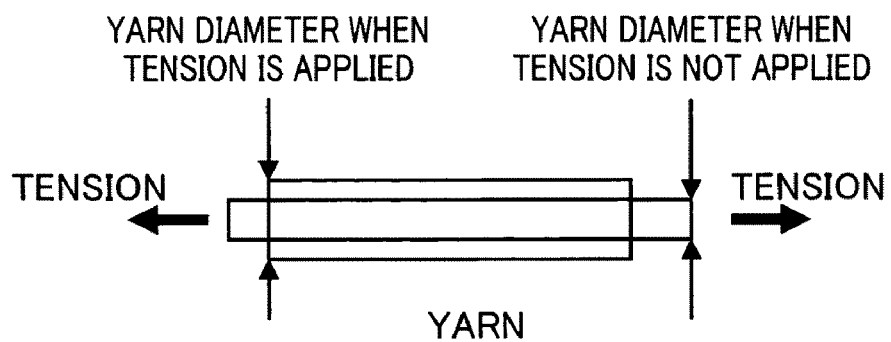
FIG. 12 is an explanatory diagram showing a yarn diameter characteristic.

FIG. 12 is an explanatory diagram showing the yarn diameter characteristic. The yarn diameter characteristic is obtained by securing one end of a yarn and pulling the other end of the same by means of the tension tester and capturing an image of the yarn with a digital camera with a magnification of 200 times and a resolution of 2560×1960 to measure the thickness of the yarn obtained at each tension applied.

Figure 13:
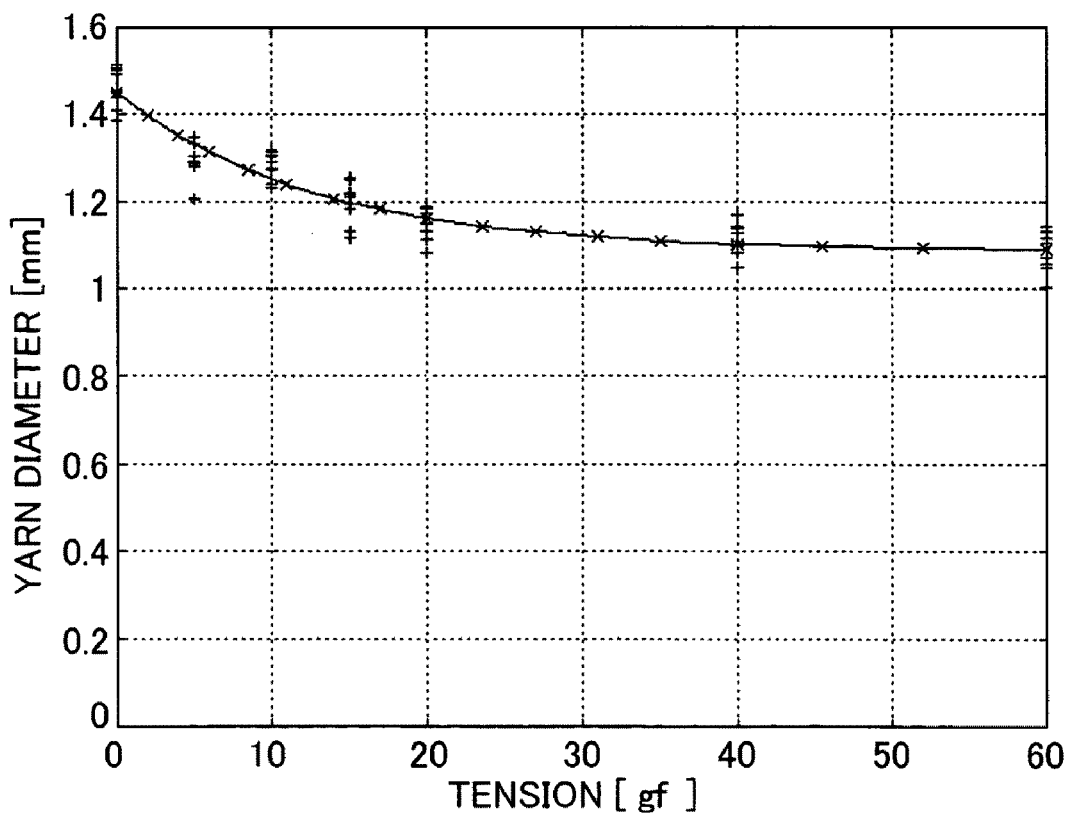
FIG. 13 is a graph showing a measurement result obtained when measuring the yarn diameter characteristic of an actual yarn by using the technique shown in FIG. 12, wherein the virtual axis shows yarn diameters and the horizontal axis show tensions.

FIG. 13 is a graph showing a measurement result obtained when measuring the yarn diameter characteristic of the actual yarn by using the technique shown in FIG. 12. The vertical axis represents the yarn diameter, and the horizontal axis represents the tension. As shown in FIG. 13, it can be seen that the yarn diameter characteristic is reduced in an exponential manner and that the yarn diameter is substantially constant in the region where a tension of 40 gf or more is applied.

Figure 14:
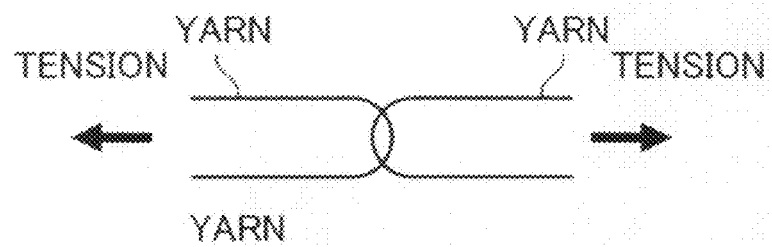
FIG. 14 is an explanatory diagram showing an intersection elongation characteristic.

FIG. 14 is an explanatory diagram showing the intersection elongation characteristic. As shown in FIG. 14, the intersection elongation characteristic is obtained by causing two yarns to intersect with each other in the form of a loop, pulling both ends of the two yarns while changing the tension, and capturing an image of the yarns with a digital camera with a magnification of 200 times and a resolution of 2560×1960 to measure the thickness of the intersecting part obtained at each tension applied.

Figure 15:
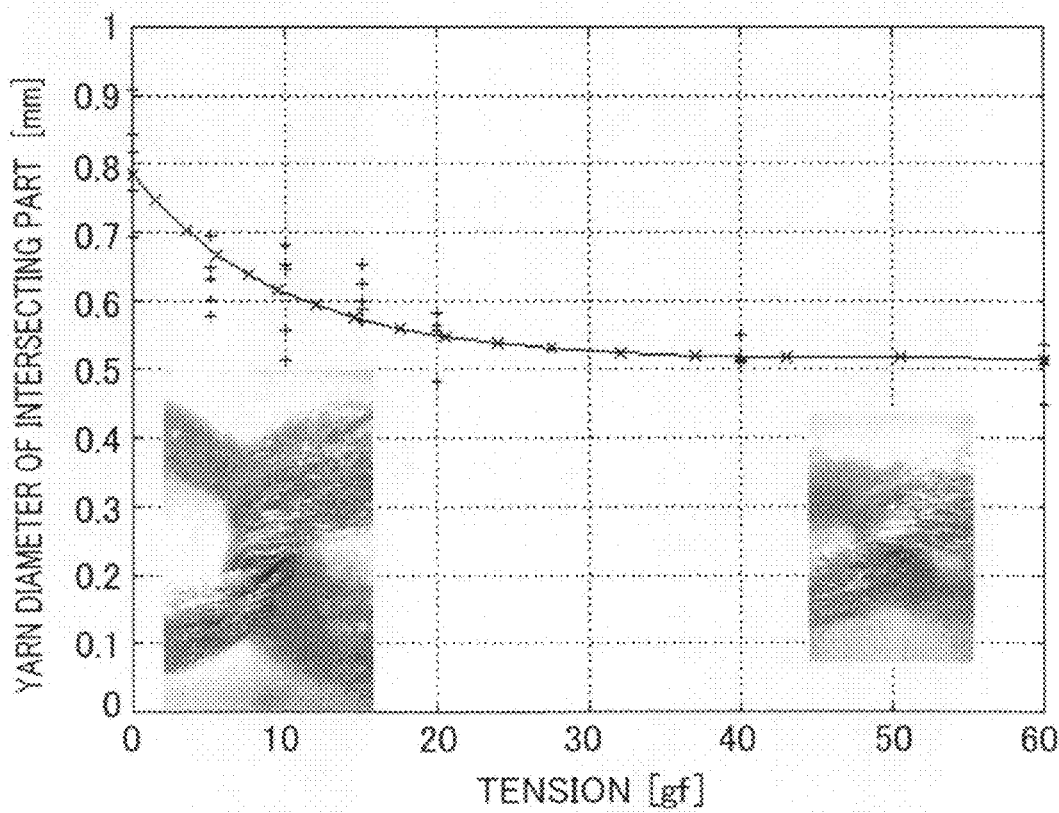
FIG. 15 is a graph showing a measurement result obtained when measuring the intersection elongation characteristic of the actual yarn by using the technique shown in FIG. 14, wherein the virtual axis shows yarn diameters of an intersecting part and the horizontal axis shows tensions.

FIG. 15 is a graph showing a measurement result obtained when measuring the intersection elongation characteristic of the actual yarn by using the technique shown in FIG. 14. The vertical axis represents the yarn diameter of the intersecting part and the horizontal axis the tension. As shown in FIG. 15, it can be seen that the intersection elongation characteristic is reduced in an exponential manner and that the yarn diameter is substantially constant in the region where at least 40 gf of tension is applied.

Returning to FIG. 4, the spring characteristic calculation portion 150 reads out the elongation characteristic, yarn diameter characteristic, and intersection elongation characteristic from the characteristic storage unit 240 to obtain an elastic coefficient and initial length of a spring component configuring each edge of a dynamic model of the warp knit from the read elongation characteristic, yarn diameter characteristic, and intersection elongation characteristic, the dynamic model being described hereinafter, and stores the elastic coefficient and initial length in a spring characteristic storage unit 250.

The initial model generation portion 160 reads out the yarn path information and the array information from the yarn path information storage unit 210 and the array information storage unit 220 respectively, and generates an initial model of the warp knit in which a yarn path is expressed by a broken line in a virtual tree-dimensional space, in accordance with the read yarn path information and array information. The virtual three-dimensional space in this embodiment is expressed by an x-axis, y-axis and z-axis that intersect with one another, the x-axis being the weft direction, the y-axis being the warp direction, wherein an x-y plane is a horizontal plane.

Figure 17A:
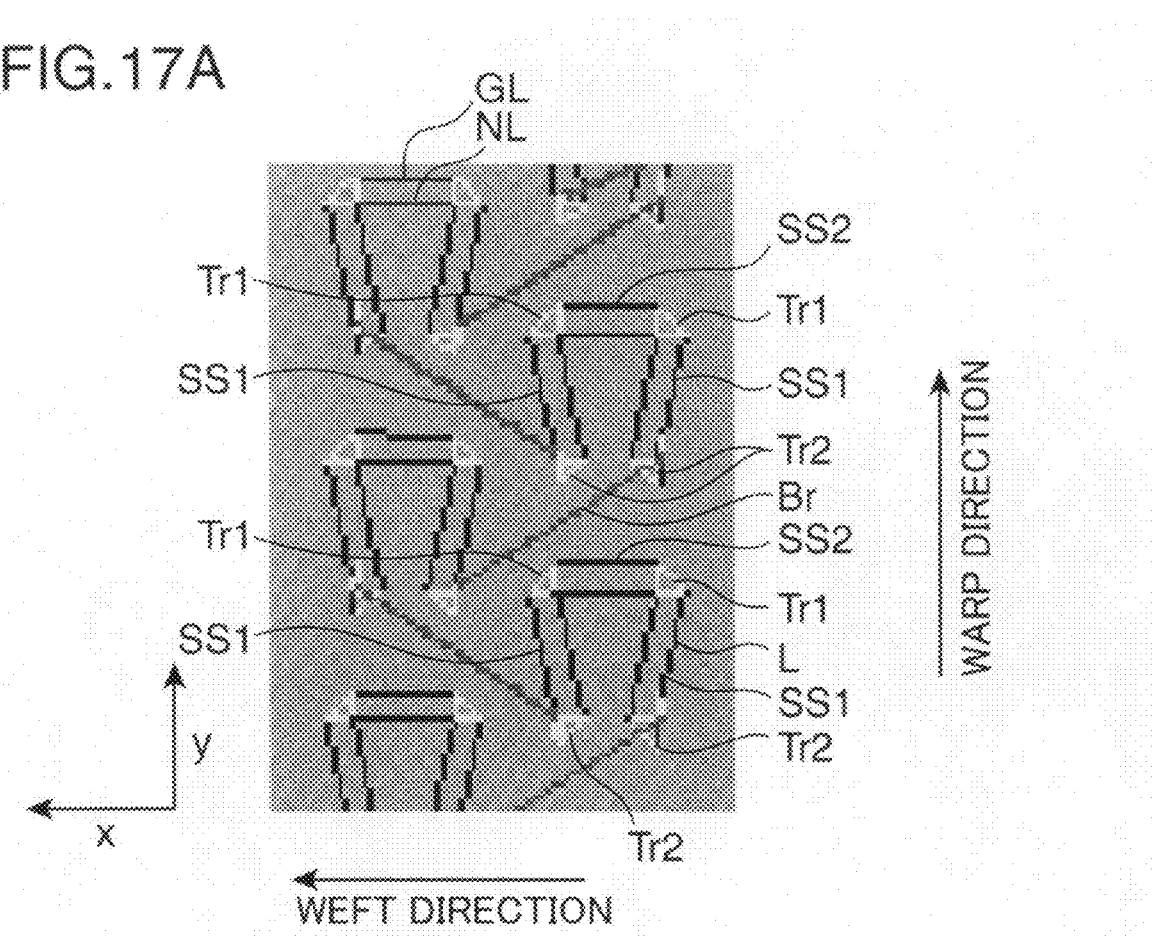
FIG. 17 is a diagram showing an initial model generated by an initial model generation portion, wherein (A) shows a situation in which the initial model is viewed from a z-axis direction and (B) shows a situation in which the initial model is viewed from a y-axis direction.

FIG. 17 is a diagram showing the initial model generated by the initial model generation portion 160, wherein (A) shows a situation in which the initial model is viewed from the z-axis direction and (B) shows a situation in which the initial model is viewed from the y-axis direction. As shown in FIG. 17(A), the initial model is configured by a plurality of loops L arrayed on the x-y plane of the virtual three-dimensional space and a bridge Br connecting the loops L together, and is expressed by broken lines formed by an outer peripheral line GL representing the outer periphery of the yarn path and an inner peripheral line NL representing the inner periphery of the yarn path. Here, the gap between the outer peripheral line GL and the inner peripheral line NL is equivalent to the thickness of the yarn.

Each of the loops L that is in a substantially U-shape and opened downward has two warp rectangular regions SS1, the longitudinal directions of which are disposed substantially parallel to the y-axis direction, a weft rectangular region SS2, the longitudinal direction of which is disposed parallel to the x-axis direction, two triangular regions Tr1 coupling the two warp rectangular regions SS1 with the one weft rectangular region SS2, and two triangular regions Tr2 coupling the two warp rectangular regions SS1 with the bridge Br. Specifically, each of the triangular regions Tr1 to Tr3 is disposed in a section where the yarn path bends (bent section).

Figure 17B:
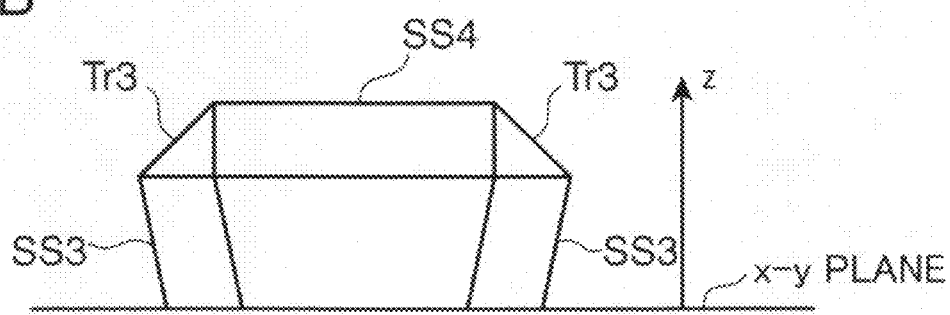

As shown in FIG. 17(B), the bridge Br in a substantially U-shape has two leg rectangular regions SS3, the longitudinal directions of which are substantially parallel to the z-axis direction, one ceiling rectangular region SS4, the longitudinal direction of which is parallel to the x-y plane, and two triangular regions Tr3 coupling the two leg rectangular regions SS3 with the one ceiling rectangular region SS4.

Here, the length of the longitudinal direction of each warp rectangular region SS1 configuring each loop L and the length of the longitudinal direction of the weft rectangular region SS2 are set at a predetermined value in response to a difference between the first and second positional data expressing the loop L. Furthermore, the length of the longitudinal direction of each leg rectangular region SS3 configuring the bridge Br is set at a predetermined value. In addition, the length of the longitudinal direction of the ceiling rectangular region SS4 configuring the bridge Br is set at a predetermined value in response to the length of the bridge Br.

The position correction portion 170 shown in FIG. 4 sets mass points of the yarns in the bent section on the yarn path that configures the initial model generated by the initial model generation portion 160, and generates the dynamic model of the warp knit by connecting the mass points using an edge to which is applied the dynamic characteristic of the actual yarn that is obtained by measuring the actual yarn, and corrects the position of each mass point by solving a motion equation of each mass point. Here, the motion equations of the mass points are expressed by Equations (1) and (2).

$$\begin{cases} f_i = m_i \dfrac{dv_i}{dt} + c_i v_i + \sum_j k_{ij} \dfrac{x_i - x_j}{|x_i - x_j|} & (1) \\ v_i = \dfrac{dx_i}{dt} & (2) \end{cases}$$

DIFFERENCE EQUATION $$\begin{cases} v_i^{(t+\Delta t)} = \dfrac{\Delta t}{m_i}\left[(c_i - m_i)v_i^{(t)} + \sum_j k_{ij} \dfrac{x_i^{(t)} - x_j^{(t)}}{|x_i^{(t)} - x_j^{(t)}|} - f_i^{(t)}\right] & (3) \\ x_i^{(t+\Delta t)} = \Delta t \, v_i^{(t)} + x_i^{(t)} & (4) \end{cases}$$

In Equations (1) and (2), the symbol i represents the $i^{th}$ mass point, $f_i$ an external force applied to the mass point, $m_i$ the mass of the mass point, $v_i$ the speed of the mass point, $c_i$ a viscosity resistance of the mass point, $k_{i,j}$ an elastic coefficient between the $i^{th}$ mass point and a $j^{th}$ mass point connected to the $i^{th}$ mass point by using an edge described hereinafter, and $x_i$ the position of the $i^{th}$ mass point within the virtual three-dimensional space. Predetermined values are employed as $m_i$, $c_i$, $k_{i,j}$ shown in Equation (1). The symbol $f_i$ is described hereinafter.

Equations (3) and (4) represent difference equations of Equations (1) and (2) respectively, and the position correction portion 170 actually corrects the positions of the mass points by solving the difference equations (3) and (4). The symbol t shown in the equations (3) and (4) represents the time and $\Delta t$ represents minute time.

Here, the dynamic model includes a coarse dynamic model that does not take into consideration the thickness of the yarn and a dense dynamic model considering the thickness of the yarn, and the position correction portion 170 corrects the positions of the mass points using the coarse dynamic model until the solutions of the motion equations converge within a predetermined range, and corrects the positions of the mass points using the dense dynamic model after the solutions of the motion equations converge within the predetermined range.

FIG. 18 is an explanatory diagram showing the dynamic model, wherein (A) shows the coarse dynamic model and (B)

shows the dense dynamic model. As shown in FIG. 18(A), the coarse dynamic model is configured by disposing one mass point MP in each of the triangular regions Tr configuring the initial model shown in FIGS. 17(A), (B), and connecting these mass points MP via edges E along the yarn path. Note that a symbol "Tr" is placed in the triangular regions to generically name the triangular regions Tr1 to Tr3. Here, each of the edges E has a spring component B1, as shown in FIG. 18(A). An elastic coefficient that is calculated by the spring component calculation portion 150 using the elongation characteristic is employed as the elastic coefficient of the spring component B1. Moreover, a value that is determined in advance in response to the length of each edge connecting the mass points MP is employed as the initial length of the spring component B1.

The dense dynamic model, on the other hand, is configured by mass points MP1 to MP3 disposed at three peaks of the triangular regions Tr shown in FIGS. 17(A), (B), and edges E1 to E7 connecting the mass points MP1 to MP3, as shown in FIG. 18(B).

Specifically, the edge E1 (first edge) is disposed along the diameter direction of a yarn path ($\alpha$) extending to one side from a triangular region TrC1 disposed in a target bent section. The edge E2 (second edge) is disposed along the diameter direction of a yarn path ($\beta$) extending to the other side from the triangular region TrC1. The mass point MP1 (first mass point) is disposed to connect one ends of the edges E1, E2 on the inner periphery side of the yarn path. The mass point MP2 (second mass point) and the mass point MP3 (third mass point) are disposed on the other ends of the edges E1 and E2 on the outer peripheral side of the yarn path.

The edge E3 (third edge) is disposed to connect the mass point MP2 to the mass point MP3. The edge E4 (fourth edge) is disposed to connect the mass point MP1 of the triangular region TrC1 to the mass point MP1 of a triangular region TrC2 disposed adjacent to the triangular region TrC1 along the yarn path ($\alpha$) extending to the one side from the triangular region TrC1. The edge E5 (fifth edge) is disposed to connect the mass point MP2 of the triangular region TrC1 to the mass point MP2 of the triangular region TrC2.

Moreover, the edge E6 (sixth edge) is disposed to connect the mass point MP1 of the triangular region TrC1 to the mass point MP1 of a triangular region TrC3 disposed adjacent to the triangular region TrC1 along the yarn path ($\beta$) extending to the other side from the triangular region TrC1. The edge E7 (seventh edge) is disposed to connect the mass point MP3 of the triangular region TrC1 to the mass point MP3 of the triangular region TrC3.

The edge E1 and the edge E2 have a spring component B2, the initial length of which is defined by the yarn diameter characteristic. The edge E3 has a spring component B3, the initial length of which is calculated by the spring characteristic calculation portion 150 by using the intersection elongation characteristic. The edges E4 to E7 each has the spring component B1, the elastic coefficient of which is calculated by the spring characteristic calculation portion 150 by using the elongation characteristic. Specifically, the spring component B1 is same as the spring component B1 configuring the coarse dynamic model.

In the coarse dynamic model the blind lap has one mass point MP set in the connection point BP between the bridges BBr, while in the dense dynamic model the blind lap has two mass points MP set in the connection point BP between the bridges BBr.

Returning to FIG. 4, the three-dimensional model generation portion 180 forms a surface expressing a yarn surface on a yarn path represented by the edge connected to each mass points, the positions of which are corrected by the position correction portion 170, generates a three-dimensional model of the warp knit, and stores the three-dimensional model in a three-dimensional model storage unit 260.

The display control unit 190 reads out the three-dimensional model of the warp knit from the three-dimensional model storage unit 260 and displays the read three-dimensional model and the like on the display portion 400. The storage unit 200 is configured mainly by the external storage unit 5 and has the yarn path information storage unit 210, the array information storage unit 220, a yarn information storage unit 230, the characteristic storage unit 240, the spring characteristic storage unit 250, and the three-dimensional model storage unit 260.

The yarn path information storage unit 210 stores the yarn path information acquired by the yarn path information acquisition portion 110. The array information storage unit 220 stores the array information acquired by the array information acquisition portion 120. The yarn information storage unit 230 stores the yarn information acquired by the yarn information acquisition portion 130. The characteristic storage unit 240 stores the dynamic characteristic of the actual yarn that is acquired by the characteristic acquisition portion 140. The spring characteristic storage unit 250 stores the elastic coefficient and the like of the spring component configuring each edge of the dynamic model of the warp knit, the elastic coefficient and the like being calculated by the spring characteristic calculation portion 150. The three-dimensional model storage unit 260 stores the three-dimensional model of the warp knit that is generated by the three-dimensional model generation portion 180.

The input portion 300 configured by the input device 1 shown in FIG. 3 accepts, from the user, an operation input for inputting the yarn path information, array information, yarn information, and the dynamic characteristic and the like of the actual yarn. The display portion 400 configured by the display device 6 shown in FIG. 3 displays various images under the control of the display control unit 190.

Figure 19:
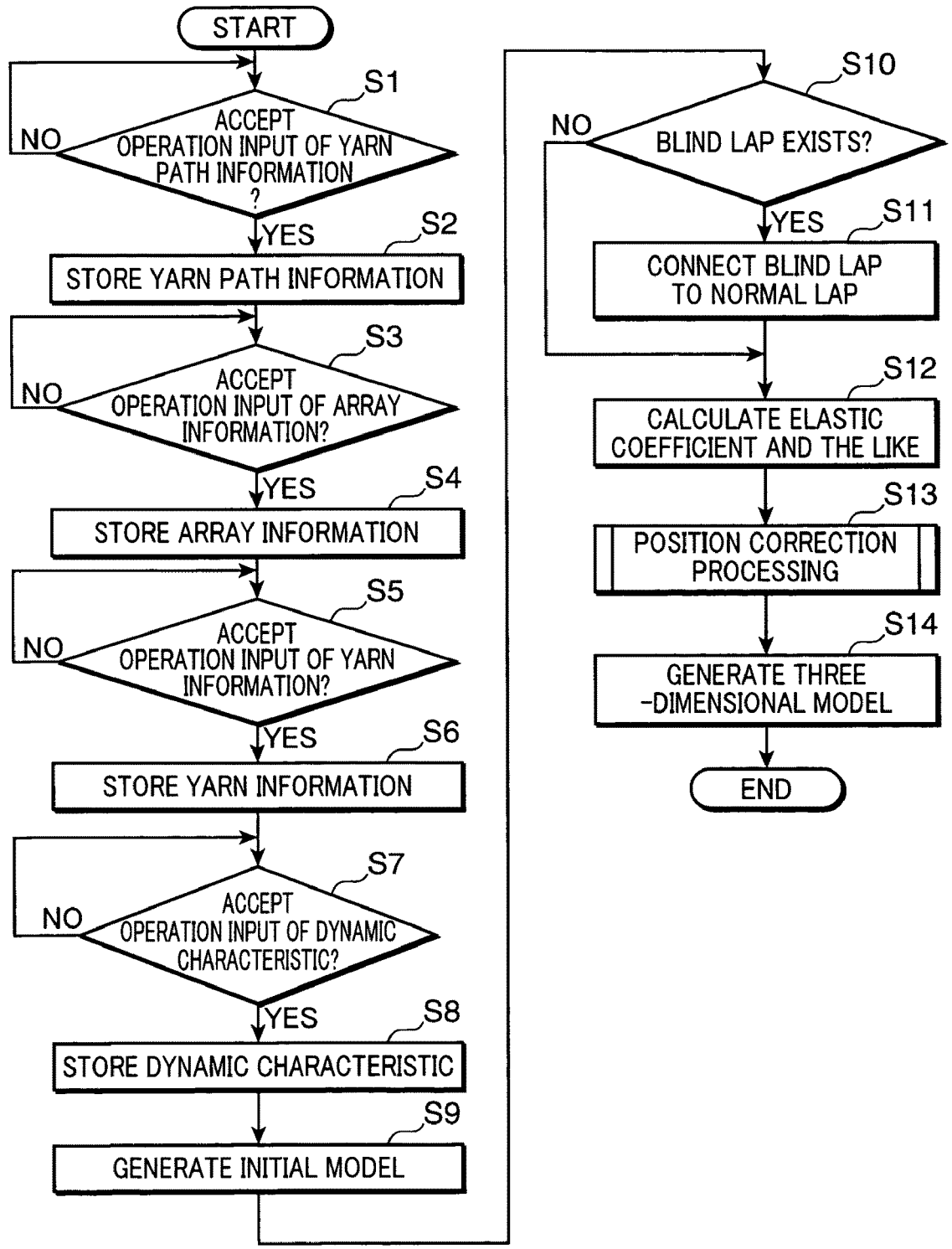
FIG. 19 is a flowchart showing an operation of the knitting structure model generation apparatus.

FIG. 19 is a flowchart showing an operation of the knitting structure model generation apparatus. First, once the input portion 300 accepts, from the user, an operation input for inputting the yarn path information (YES in step S1), the yarn path information acquisition portion 110 acquires the yarn path information in accordance with the operation input accepted by the input portion 300, and stores the yarn path information in the yarn path information storage unit 210 (step S2). In this case, the yarn path information acquisition portion 110 acquires the yarn path information shown in FIG. 5. Specifically, the display control unit 190 displays on the display portion 400 an operation image for inputting the yarn path information, and the yarn path information acquisition portion 110 acquires the yarn path information by allowing the user to operate the operation image. Here, the display control unit 190 displays on the display portion 400 an operation image composed of a plurality of grids to which the coordinates in the warp direction and weft direction shown in FIG. 6(A) are applied. The yarn path information acquisition portion 110 acquires the yarn path information by allowing the user to use a mouse or the like to specify the first and second end points P1 and P2 of the loop L configuring the yarn path.

On the other hand, when the input portion 300 does not accept from the user the operation input for inputting the yarn path information in step S1 (NO in step S1), the processing returns to step S1.

Next, when the input portion 300 accepts from the user the operation input for inputting the array information (YES in step S3), the array information acquisition portion 120 acquires the array information in accordance with the operation input accepted by the input portion 300 and stores the array information in the array information storage unit 220 (step S4). In this case, the array information acquisition portion 120 acquires the array information shown in FIG. 7. Specifically, the display control unit 190 displays on the display portion 400 an operation image for inputting the array information, and the array information acquisition portion 120 acquires the array information by allowing the user to operate this operation image.

On the other hand, when the input portion 300 does not accept from the user the operation input for inputting the array information in step S3 (NO in step S3), the processing returns to step S3.

Next, when the input portion 300 accepts from the user an operation input for inputting the yarn information (YES in step S5), the yarn information acquisition portion 130 acquires the yarn information in accordance with the operation input accepted by the input portion 300, and stores the yarn information in the yarn information storage unit 230 (step S6). In this case, the array information acquisition portion 120 acquires the yarn information shown in FIGS. 9(A), (B). Specifically, the display control unit 190 displays on the display portion 400 an operation image for inputting the yarn information, and the yarn information acquisition portion 130 acquires the yarn information by allowing the user to operate this operation image.

On the other hand, when the input portion 300 does not accept from the user the operation input for inputting the yarn information in step S5 (NO in step S5), the processing returns to step S5.

Next, when the input portion 300 accepts from the user an operation input for inputting the dynamic characteristic of the actual yarn (YES in step S7), the characteristic acquisition portion 140 acquires the elongation characteristic, yarn diameter characteristic, and intersection elongation characteristic of the actual yarn in accordance with the operation accepted by the input portion 300, and stores the elastic characteristic, yarn diameter characteristic, and intersection elongation characteristic of the actual yarn in the characteristic storage unit 240 (step S8).

Next, the initial model generation portion 160 reads out the yarn path information and the array information from the yarn path information storage unit 210 and the array information storage unit 220 respectively, and generates in a virtual three-dimensional space the initial model of the warp knit in which the yarn path is expressed by a broken line, in accordance with the read yarn path information and array information (step S9). For example, in the array information shown in FIG. 7, because 1 is set in the position having "0" as the coordinate of the L0$^{th}$ layer in the weft direction, the initial model generation portion 160 generates in the virtual three-dimensional space the initial model of the warp knit by disposing the broken line representing the yarn path, so as to dispose the broken line expressing the yarn path represented by the yarn path information of the L0$^{th}$ layer shown in FIG. 5, within the virtual three-dimensional space.

Here, the initial model generation portion 160 determines the color of the yarn path in accordance with the yarn information shown in FIG. 9. For example, as shown in FIG. 9(B), because the color (R=1.0, G=0.5, B=0.1) defined by index=1 shown in FIG. 9(A) is set in the yarn path disposed in the position where the coordinate of the L1$^{st}$ layer in the weft direction is "0," the initial model generation portion 160 sets this color for this yarn path.

Figure 21A:
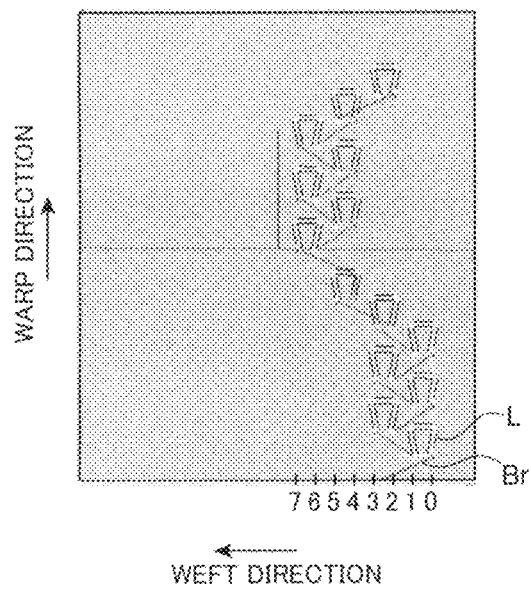
FIG. 21 is a diagram showing an example of the initial model generated by the initial model generation portion.

FIGS. 21(A), (B) are each a diagram showing an example of the initial model generated by the initial model generation portion 160. As shown in FIGS. 21(A), (B), it can be seen that the initial model is configured by the plurality of loops L arrayed on a plane and the bridges Br connecting the loops L. In the initial model shown in FIG. 21(A), one column of yarn path composed of the loops L is shown, the loops L striding the coordinates in the weft direction, "0, 1," "2, 1," and the like.

Figure 21B:
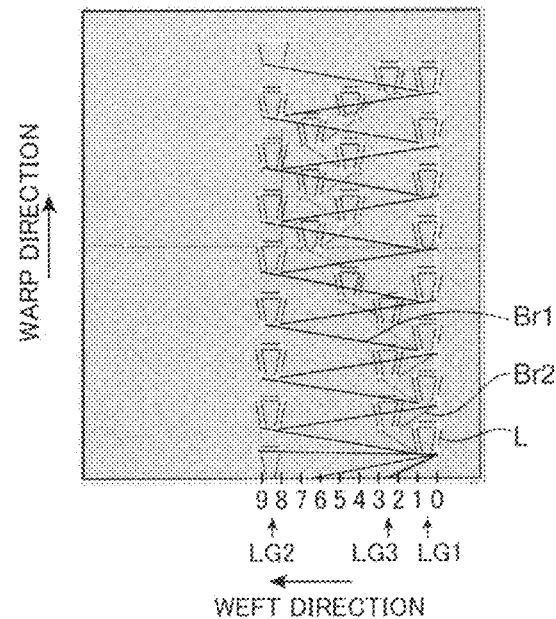

In the initial model shown in FIG. 21(B), two columns of yarn paths are shown, one of which is configured by a loop LG1 in which the loop L is arrayed so as to stride the coordinate in the weft direction, "0, 1," a loop group LG2 in which the loop L is arrayed so as to stride the coordinate in the weft direction, "8, 9," and the bridge Br1 that alternately connects the loops L configuring these loop groups LG1, LG2. The other yarn path of the two yarn paths shown in FIG. 21(B) is configured by a loop group LG1 in which the loop L is arrayed so as to stride the coordinates in the weft direction, "0, 1," a loop group LG3 in which the loop L is arrayed between the coordinates in the weft direction, "1" to "8," and the bridge Br2 that alternately connects the loops L configuring these loop groups LG1, LG3.

Next, when the blind lap exists in the yarn path information acquired in step S1 (YES in step S10), the initial model generation portion 160 executes the processing for connecting the blind lap to the normal lap (step S11), and, when the blind lap does not exist (NO in step S10), advances the processing to step S12. Here, when there exists the yarn path information composed of a data group having the same value as the first and second data, the initial model generation portion 160 determines that the yarn path represented by this yarn path information is the blind lap.

FIG. 22 is an explanatory diagram showing a processing for connecting the blind lap and the normal lap to each other, wherein the processing proceeds in order of (A) to (F). First, the initial model generation portion 160 arrays a yarn path of the blind lap as shown in FIG. 22(A), in accordance with the yarn path information and the array information. In this case, out of the bridges BBr configuring the blind lap, the first bridge BBr1 to be targeted, the second bridge BBr2 connected to one end (connection point BP) of the first bridge BBr1, and the bridges Br configuring the normal lap are not connected together, as shown in FIG. 22(A).

Next, the initial model generation portion 160 divides the two leg parts AS and one ceiling part HT that configure each bridge Br into a single straight segment, as shown in FIG. 22(B). The ceiling part HT is not shown in FIG. 22(B).

Next, the initial model generation portion 160 determines whether or not the leg parts AS exist in a triangular internal region TD enclosed by the first bridge BBr1 and the second bridge BBr2, as shown in FIG. 22(C).

Next, when the initial model generation portion 160 determines that the leg parts AS exist, [the initial model generation portion 160 specifies the leg part AS nearest to the connection point BP out of the leg parts AS existing in the internal region TD, as shown in FIG. 22(D).

Next, the initial model generation portion 160 connects one end AS1 of the leg part AS nearest to the connection point BP to the connection point BP by means of the straight segment, and connects the other end AS2 of the leg part AS to the connection point BP by means of the straight segment, as shown in FIG. 22(E).

Then, as shown in FIG. 22(F), the initial model generation portion 160 moves the position of the one end AS1 of the leg part AS to a position where the values of the x-coordinate and y-coordinate of the one end AS1 of the leg part AS are equal to the values of the x-coordinate and y-coordinate of the connection point BP, and also moves the position of the other end AS2 of the leg part AS to a position where the values of the x-coordinate and y-coordinate of the other end AS2 of the leg part AS are equal to the values of the x-coordinate and y-coordinate of the connection point BP.

As a result, as shown in FIG. 22(F), the connection part BP and the leg part AS are connected to each other, and the blind lap and the normal lap are connected to each other.

Figure 23:
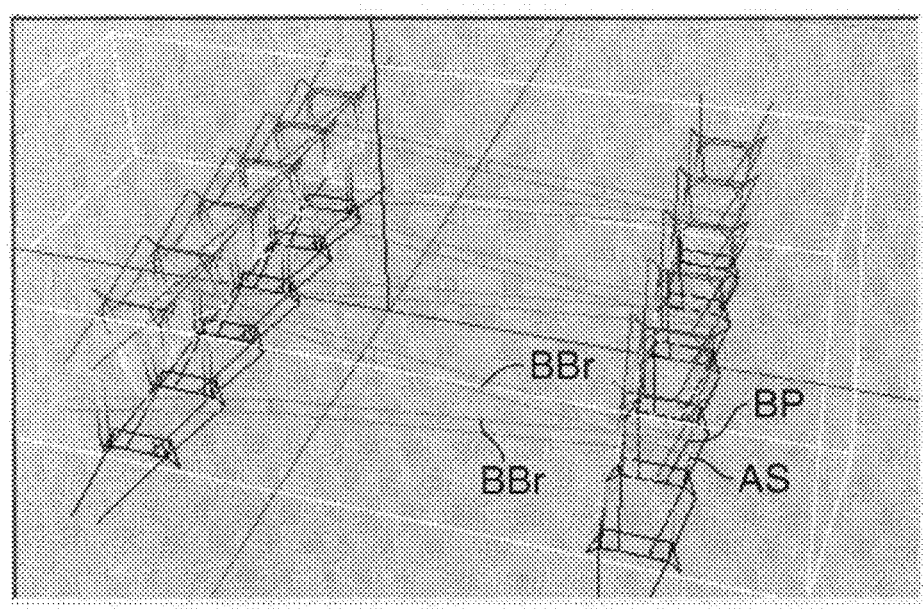
FIG. 23 is a diagram showing the initial model in which the normal lap and the blind lap are connected to each other.

FIG. 23 is a diagram showing the initial model in which the normal lap and the blind lap are connected to each other. As shown in FIG. 23, it can be seen that the leg part AS of the bridge Br configuring the normal lap is connected to the connection point BP of the bridge BBr configuring the blind lap so that the normal lap is held by the blind lap.

Next, in step S12 shown in FIG. 19, the spring characteristic calculation portion 150 calculates the elastic coefficient of the spring component B1 shown in FIGS. 18(A), (B) by using the elongation characteristic acquired by the characteristic acquisition portion 140, calculates the initial length of the spring component B2 shown in FIG. 18(B) by using the yarn diameter characteristic acquired by the characteristic acquisition portion 140, and calculates the initial length of the spring component B3 shown in FIG. 18(B) by using the intersection elongation characteristic acquired by the characteristic acquisition portion 140.

Here, the spring characteristic calculation portion 150 calculates the elastic coefficient of the spring component B1 from the inclination of the straight line regions, in the elongation characteristic of the yarn used in the modeling target warp knit shown in FIG. 11. The spring characteristic calculation portion 150 also calculates the yarn diameter as the initial length of the spring component B2 when the tension is 0, in the yarn diameter characteristic shown in FIG. 13. The spring characteristic calculation portion 150 calculates the yarn diameter as the initial length of the spring component B3 when the tension is 0, in the intersection elongation characteristic shown in FIG. 15.

Figure 20:
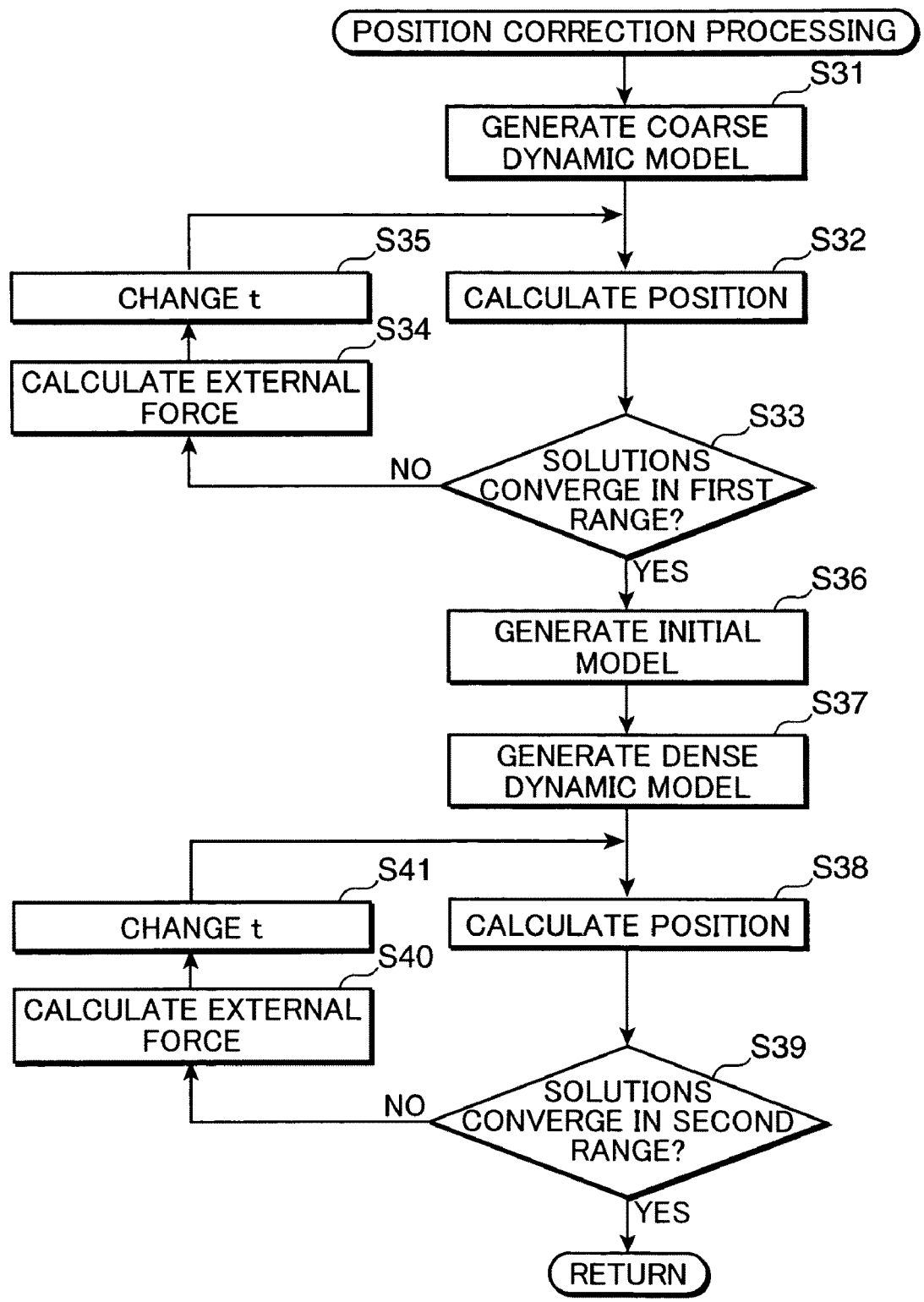
FIG. 20 is a flowchart showing a position correction processing.

Next, the position correction portion 170 executes a position correction processing (step S13). FIG. 20 is a flowchart showing the position correction processing. First, the position correction portion 170 sets one mass point MP in the triangular regions Tr configuring the initial model generated by the initial model generation portion 160, connects the set mass point MP via the edge E along the yarn path, and generates the coarse dynamic model (step S31). Here, for example, the center of gravity of the triangular regions Tr can be adopted as the position of the mass point MP.

Figure 24:
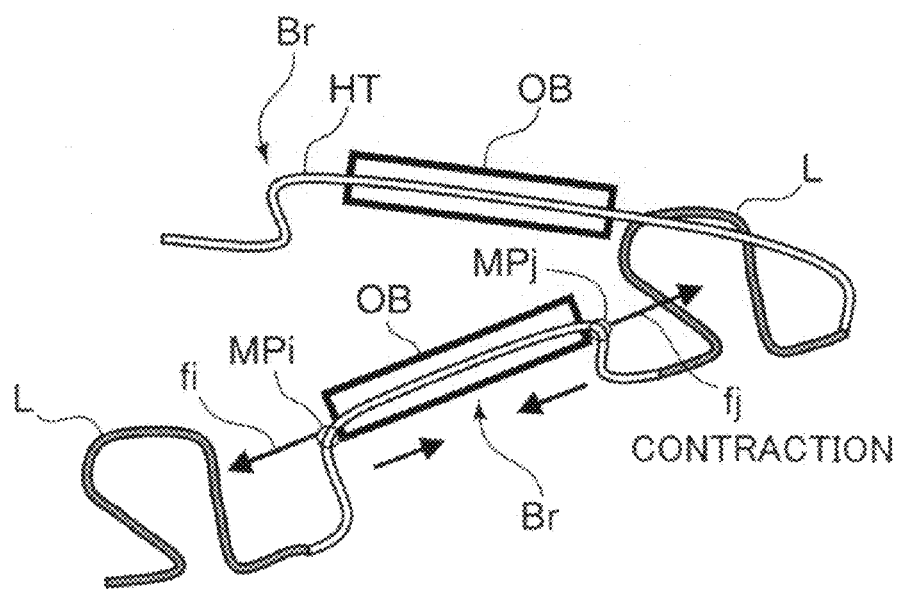
FIG. 24 is an explanatory diagram showing an external force calculation processing.

Next, the position correction portion 170 establishes the motion equations shown in Equations (3), (4) for each mass point MP, provides initial values to $f_i$, $v_i$, $x_i$, $x_j$, and obtains the position of each mass point MP at the time t by solving the motion equations (step S32). The position correction portion 170 then calculates an external force $f_i$ (step S34) when the solutions of the motion equations of the mass points MP do not converge within a first range (NO in step S33). Note that when the solutions of the motion equations are arranged in time series, a predetermined value that indicates that the difference between the first and latter solutions is somewhat small is adopted as the first range. FIG. 24 is an explanatory diagram showing an external force calculation processing.

Here, as shown in FIG. 24, the position correction portion 170 sets, on the ceiling part HT of each bridge Br configuring the normal lap, a rectangular solid OB whose cross sectional size is same as that of the yarn, and, when the rectangular solid OB intersects with another as the ceiling part HT contracts, applies external forces $f_i$, $f_j$ of a predetermined intensity to a direction in which the intersection is prevented, i.e., a direction opposite to the direction in which the ceiling part HT contracts, in the mass points $MP_i$, $MP_j$ on both ends of the intersecting rectangular solids OB. On the other hand, the position correction portion 170 does not apply the external force $f_i$, $f_j$ to the mass points $MP_i$, $MP_j$ on both ends of the rectangular solids OB that do not intersect with each other. Note that an OBB (Oriented Bounding Box), for example, is used to determine whether the rectangular solids are intersecting with each other. Next, the position correction portion 170 adds Δt to the time t (step S35) and returns the processing to step S32. Note that a predetermined value is adopted as Δt.

In step S33, when the solutions of the motion equations converge within the first range (YES in step S33), the initial model generation portion 160 sets the triangular regions Tr in the bent section of the coarse dynamic model in which the positions of the mass points MP are corrected by the position correction portion 170, sets a warp rectangular region SS1, weft rectangular region SS2, leg rectangular region SS3, and ceiling rectangular region SS4 between the triangular regions Tr along the edge E connecting the mass points MP, and generates the initial model again (step S36).

As shown in FIG. 18(B), the position correction portion 170 then disposes the mass points MP1 to MP3 at three peaks of each triangular region Tr in the initial model generated in step S36 in which the positions of the mass points MP are corrected, and generates the dense dynamic model by connecting these mass points MP1 to MP3 via the edges E1 to E7 (step S37).

Next, the position correction portion 170 establishes the motion equations shown in Equations (3), (4) for each of the mass points MP1 to MP3 to provide an initial value to $f_i$, $v_i$, $x_i$, $x_j$, and obtains the positions of the mass points MP1 to MP3 at the time t by solving the motion equations (step S38). The position correction portion 170 thereafter calculates the external force $f_i$ (step S40) when the solutions of the motion equations of the mass points MP1 to MP3 do not converge within a second range (NO in step S39), adds Δt to the time t (step S41), and returns the processing to step S38. Note that the second region is smaller than the first region and a predetermined value that indicates that the solutions of the motion equations are obtained is adopted. Moreover, the explanation of the processing for calculating the external force $f_i$ in step S40 is omitted, as it is same as that of step S34.

Figure 25A:
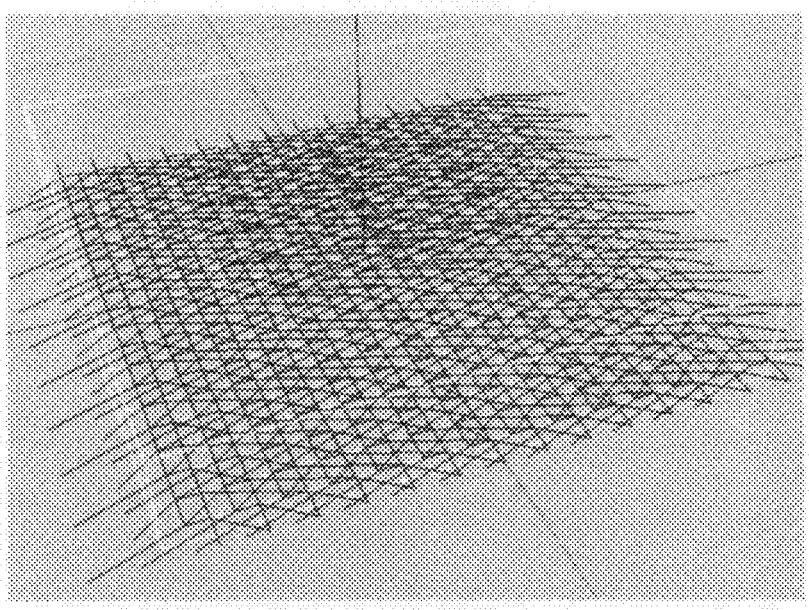
FIG. 25 is a diagram showing how the coarse dynamic model is deformed, wherein (A) shows the coarse dynamic model before deformation and (B) shows the deformed coarse dynamic model.
Figure 25B:
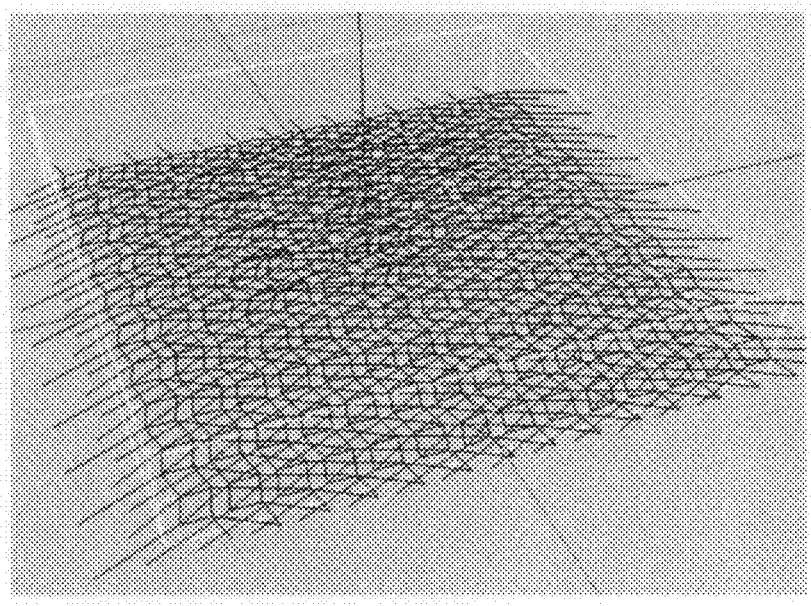
Figure 26:
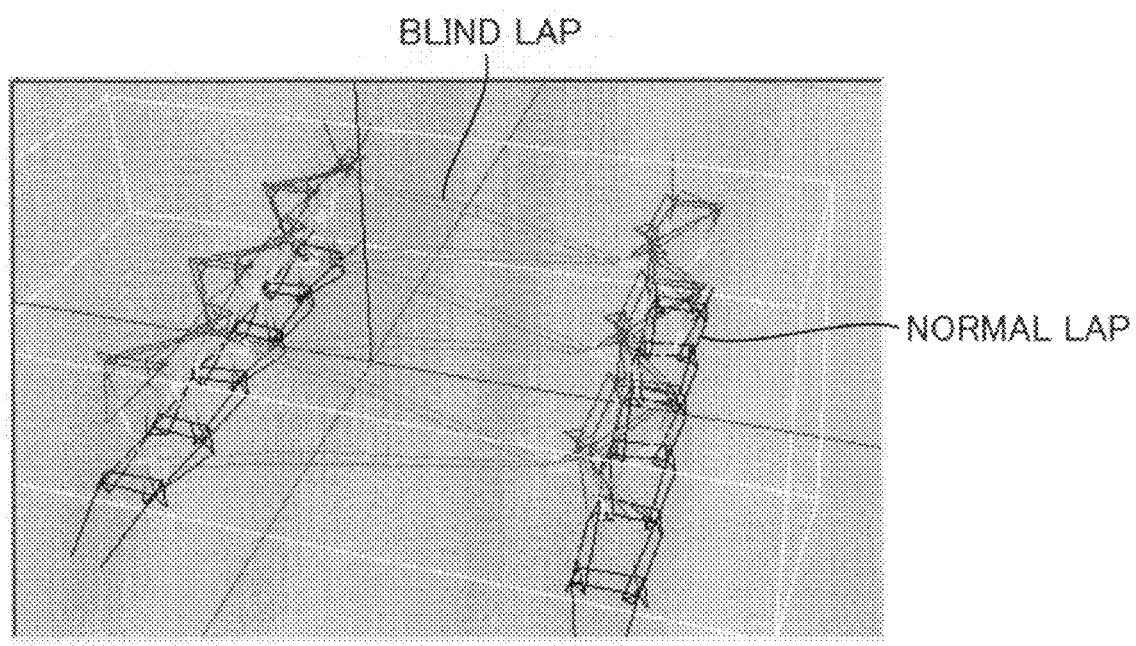
FIG. 26 is a diagram showing the dense dynamic model having the blind lap that is deformed by solving a motion equation.

FIG. 25 is a diagram showing how the coarse dynamic model is deformed as shown in the flowchart in FIG. 20, wherein (A) shows the coarse dynamic model before deformation and (B) shows the coarse dynamic model after deformation. As shown in FIGS. 25(A), (B), it can be seen that the edges E connecting the mass points are contracted by solving the motion equations of the mass points MP. FIG. 26 is a diagram showing the dense dynamic model containing the blind lap that is deformed by solving the motion equations. As shown in FIG. 26, it can be seen that the normal lap is held by the blind lap and thereby contracted and deformed.

Figure 27:
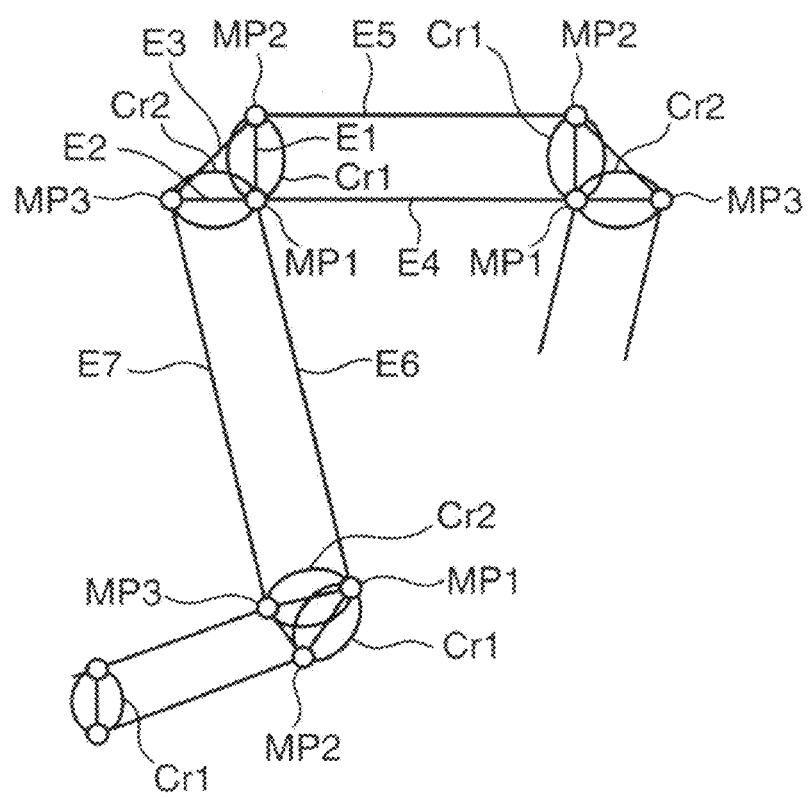
FIG. 27 is an explanatory diagram showing a processing performed by a three-dimensional model generation portion.

Returning to step S14 shown in FIG. 19, the three-dimensional model generation portion 180 forms a surface expressing the yarn surface on the yarn path in accordance with the edges E1 to E7 connecting the mass points MP1 to MP3 together in the dense dynamic model in which the positions of the mass points MP1 to MP3 are corrected by the position correction portion 170, and generates the three-dimensional model of the warp knit. FIG. 27 is an explanatory diagram showing a processing performed by a three-dimensional model generation portion 180.

First, the three-dimensional model generation portion 180 sets, as shown in FIG. 27, a circle Cr1, whose diameter corresponds to the distance between the mass point MP1 and the mass point MP2, as the cross section of the yarn, and sets a circle Cr2, whose diameter corresponds to the distance between the mass point MP1 and the mass point MP3, as the cross section of the yarn.

The three-dimensional model generation portion 180 then forms a surface that smoothly connects the outer peripheries of two circles Cr1 on both sides of the edges E4, E5 into a side surface of the yarn. Then, the three-dimensional model generation portion 180 forms a surface that smoothly connects the outer peripheries of two circles Cr2 on both sides of the edges E6, E7 into a side surface of the yarn. Next, the three-dimensional model generation portion 180 forms a surface that smoothly connects the outer peripheries of the circles Cr1 and Cr2 set in the same triangular region Tr into a side surface of the yarn.

Figure 28:
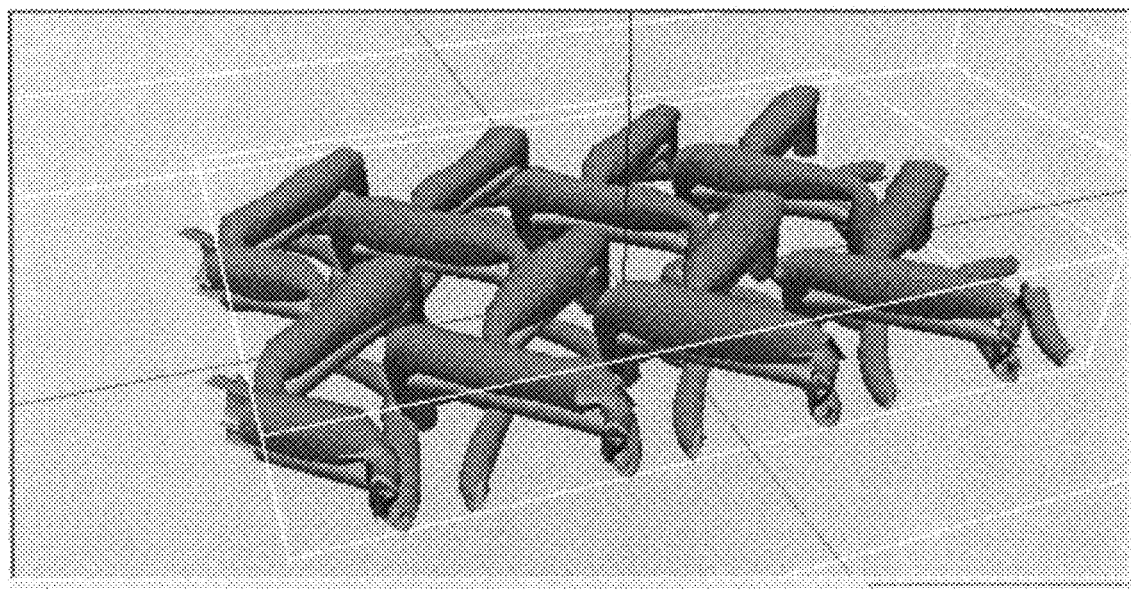
FIG. 28 is a diagram showing a three-dimensional model generated by the three-dimensional model generation portion.

FIG. 28 is a diagram showing a three-dimensional model generated by the three-dimensional model generation portion 180. As shown in FIG. 28, a three-dimensional model having reproduced the thickness of the yarn is generated.

Figure 29:
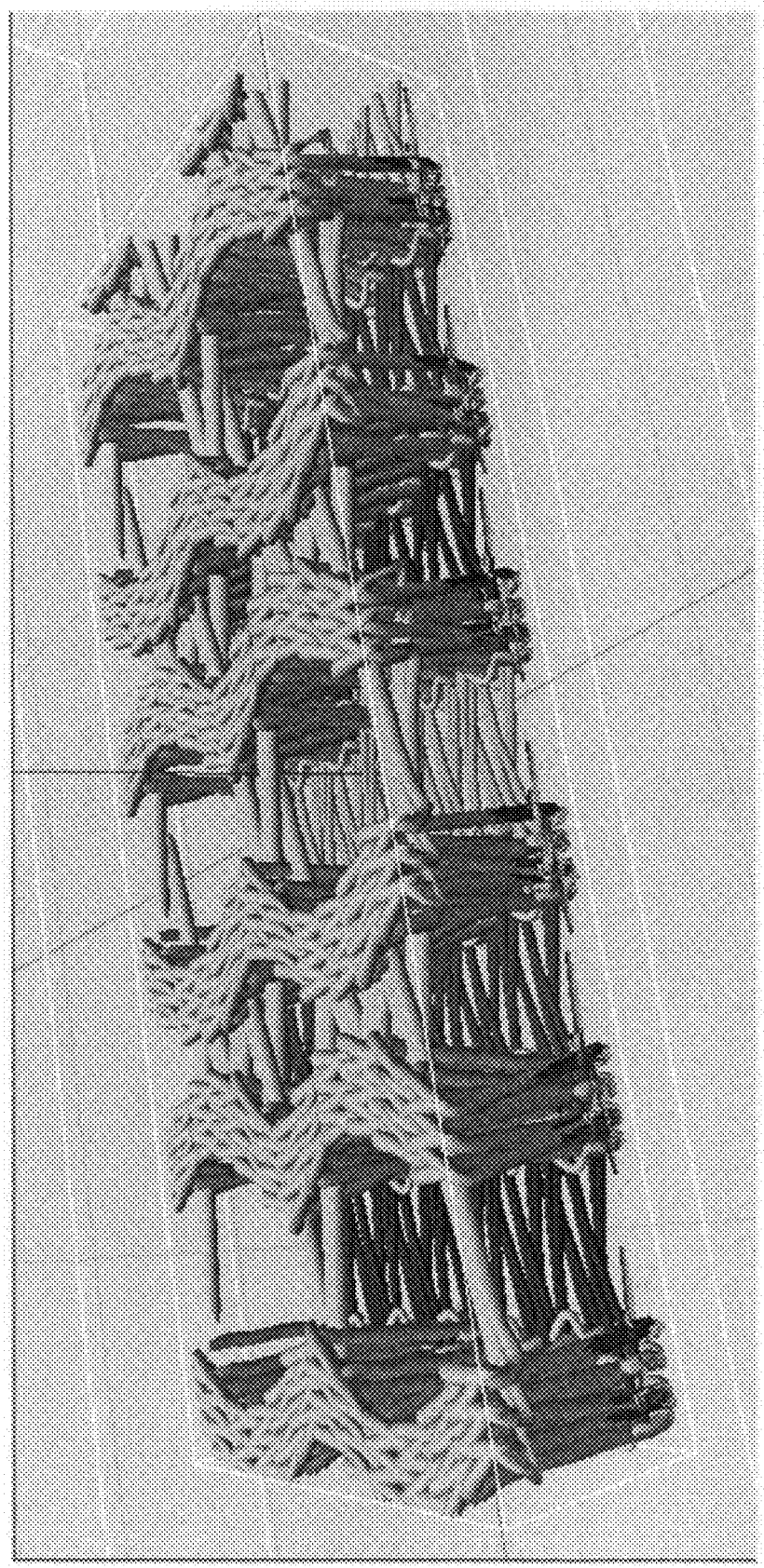
FIG. 29 shows a three-dimensional model of a warp knit having the blind lap.

FIG. 29 shows a three-dimensional model of a warp knit having the blind lap. As shown in FIG. 29, the normal lap is held by the blind lap and thereby deformed in its shape, whereby a pattern is formed.

As described above, according to the knitting structure model generation apparatus, the yarn path information representing one column of yarn path in the warp direction of the warp knit is acquired, the array information representing the array position in the weft direction of the yarn path represented by the yarn path information is acquired, and the dynamic characteristic of the actual yarn obtained by measuring the actual yarn is acquired. An initial model of the warp knit in which the yarn path is expressed by a broken line is generated in a virtual three-dimensional space, mass points of the yarn are set in characteristic positions on the yarn path to configure the initial model. A dynamic model of the warp knit is generated by connecting the mass points using edges that are applied with the dynamic characteristic of the actual yarn obtained by measuring the actual yarn. The positions of the mass points are corrected by solving the motion equations of the mass points. A surface expressing the yarn surface is formed on the yarn path represented by the edge connecting the mass points whose positions are corrected. As a result, a three-dimensional model of the warp knit is generated.

Specifically, because the dynamic characteristic of the actual yarn is incorporated in the motion equations and the three-dimensional model of the warp knit is generated by solving the motion equations, it is possible to generate a three-dimensional model of the warp knit in which the knitting structure is reproduced realistically.

A computer-readable recording medium which stores knitting structure model generation program according to the present invention is a knitting structure model generation program for generating a knitting structure model of a warp knit within a virtual three-dimensional space, the program causing a computer to function as: a path information acquisition portion for acquiring yarn path information representing a yarn path in a warp direction of the warp knit; an array information acquisition portion for acquiring array information representing an array position in a weft direction of the yarn path represented by the yarn path information; an initial model generation portion for generating within the virtual three-dimensional space an initial model of the warp-knitted fabric in which the yarn path is expressed in a broken line, in accordance with the yarn path information and the array information; a position correction portion for setting mass points of a yarn in characteristic positions on the yarn path constituting the initial model, generating a dynamic model of the warp knit by connecting the mass points by using an edge applied with a dynamic characteristic of an actual yarn that is obtained by measuring the actual yarn, and correcting the position of each mass point by solving a motion equation of each mass point; and a three-dimensional model generation portion for forming a surface expressing a yarn surface on a yarn path represented by the edge connected to the mass points whose positions are corrected by the position correction portion, and thereby generating a three-dimensional model of the warp knit.

The knitting structure model generation apparatus according to the present invention is a knitting structure model generation apparatus for generating a knitting structure model of a warp knit within a virtual three-dimensional space, the apparatus having: a path information acquisition portion for acquiring yarn path information representing a yarn path in a warp direction of the warp knit; an array information acquisition portion for acquiring array information representing an array position in a weft direction of the yarn path represented by the yarn path information; an initial model generation portion for generating within the virtual three-dimensional space an initial model of the warp-knitted fabric in which the yarn path is expressed in a broken line, in accordance with the yarn path information and the array information; a position correction portion for setting mass points of a yarn in characteristic positions on the yarn path constituting the initial model, generating a dynamic model of the warp knit by connecting the mass points by using an edge applied with a dynamic characteristic of an actual yarn that is obtained by measuring the actual yarn, and correcting the position of each mass point by solving a motion equation of each mass point; and a three-dimensional model generation portion for forming a surface expressing a yarn surface on a yarn path represented by the edge connected to the mass points whose positions are corrected by the position correction portion, and thereby generating a three-dimensional model of the warp knit.

The knitting structure model generation method according to the present invention is a knitting structure model generation method for generating a knitting structure model of a warp knit within a virtual three-dimensional space, the method having: a step in which a computer acquires yarn path information representing a yarn path in a warp direction of the warp knit; a step in which the computer acquires array information representing an array position in a weft direction of the yarn path represented by the yarn path information; a step in which the computer generates within the virtual three-dimensional space an initial model of the warp-knitted fabric in which the yarn path is expressed in a broken line, in accordance with the yarn path information and the array information; a step in which the computer sets mass points of a yarn in characteristic positions on the yarn path constituting the initial model, generating a dynamic model of the warp knit by connecting the mass points by using an edge applied with a dynamic characteristic of an actual yarn that is obtained by measuring the actual yarn, and correcting the position of each mass point by solving a motion equation of each mass point; and a step in which the computer forms a surface expressing a yarn surface on a yarn path represented by the edge connected to the mass points whose positions are corrected, and thereby generating a three-dimensional model of the warp knit.

According to these configurations, the yarn path information representing a yarn path in a warp direction of a warp knit is acquired, and the array information representing an array position in a weft direction of the yarn path represented by the yarn path information is acquired. Then, an initial model of the warp knit in which the yarn path is expressed in a broken line is generated within a virtual three-dimensional space in accordance with the yarn path represented by the yarn path information and the yarn position represented by the array information. Mass points of a yarn are set in characteristic positions on the yarn path constituting the initial model, and the mass points are connected by using an edge applied with a dynamic characteristic of an actual yarn that is obtained by measuring the actual yarn, whereby a dynamic model of the warp knit is generated. The position of each mass point is corrected by solving a motion equation of each mass point, and a surface expressing a yarn surface is formed on the yarn path represented by the edge connected to the mass points whose positions are corrected, whereby a three-dimensional model of the warp knit is generated.

Specifically, because the dynamic characteristic of the actual yarn is incorporated in the motion equations and the three-dimensional model of the warp knit is generated by solving the motion equations, the three-dimensional model of the warp knit in which the knitting structure is reproduced realistically can be generated.

(2) It is preferred that the warp knit be configured by a plurality of warp-knitted layers stacked in a height direction perpendicular to the warp direction and the weft direction, the yarn path information represent one column of yarn path in the warp direction of each warp-knitted layer, and the array information represent the array position in the weft direction of each warp-knitted layer of the yarn path represented by the yarn path information.

According to this configuration, it is possible to generate a warp-knitted model of a warp knit configured by a plurality of warp-knitted layers stacked in the height direction perpendicular to the warp direction and the weft direction.

(3) It is preferred that the yarn path have the normal lap that is configured by a plurality of loops arrayed in the warp direction at certain intervals, and a bridge that connects the loops while meandering along the yarn path, that the yarn path information express the normal lap by successively arraying the first and second positional data along the yarn path, the first and second positional data representing the positions in the weft direction of the first and second end points representing two end points on each loop.

According to this configuration, the user can input the yarn path information by simply performing an easy input operation for arraying the first and second positional data along the yarn path, the first and second positional data representing the positions in the weft direction of the first and second end points representing two characteristic positions on each loop.

(4) It is preferred that the first positional data be located on the upstream side of the yarn path from the second positional data, and that the yarn path information of the normal lap set a first loop as an open stitch when a yarn path direction in the weft direction of a target bridge that connects the target first loop and a second loop located on the downstream side in the yarn path direction from the first loop is same as a vector direction directed from the first end point configuring the first loop to the second end point, and also set the first loop as a closed stitch when a yarn path direction in the weft direction of the target bridge is opposite of the vector direction directed from the first end point configuring the first loop to the second end point.

According to this configuration, the open stitch and the closed stitch can be expressed by changing the order of arrangement of the first and second positional data.

(5) It is preferred that the knitting structure model generation program further have a color information acquisition portion for acquiring the color information representing the color of each yarn path configuring the warp knit, and that the initial model generation portion set the color of each yarn in accordance with the color information.

According to this configuration, the color of each of the yarn paths configuring the warp knit can be set in accordance with the color information set by the user.

(6) It is preferred that the dynamic model have the coarse dynamic model that does not take into consideration the thickness of a yarn and the dense dynamic model considering the thickness of a yarn, and that the position correction portion use the coarse dynamic model until the positions of the mass points converge within a predetermined range, and use the dense dynamic model after the positions of the mass points converge within the predetermined range.

According to this configuration, because the positions of the mass points are corrected by using the coarse dynamic model until the solutions of the motion equations converge within the predetermined range, and the positions of the mass points are corrected by using the dense dynamic model after the solutions of the motion equations converge within the predetermined range, the processing for correcting the positions can be performed at high speed and high degree of accuracy.

(7) It is preferred that the dynamic characteristic have the elongation characteristic of the yarn that represents the relationship between the tension applied to the yarn and the elongation of the yarn resulting from the tension, that the coarse dynamic model be configured by one mass point disposed in the bent section of the yarn path and an edge connecting the mass points along the yarn path, and that the edge have a spring component whose elastic coefficient is defined by the elongation characteristic.

According to this configuration, the structure of the warp knit can be reproduced somewhat realistically.

(8) It is preferred that the dynamic characteristic have not only the elongation characteristic but also the yarn diameter characteristic representing the relationship between the tension applied to the yarn and the yarn diameter resulting from the tension, and the intersection elongation characteristic representing the relationship between the tension applied to the yarn at the intersecting point where yarns intersect with each other and the yarn diameter resulting from the tension, and that the dense dynamic model have the first to third mass points disposed in each bent section and the first to seven edges connecting the first to third mass points together, the first edge being disposed along a diameter direction of a yarn path extending to one side from the target first bent section, the second edge being disposed along the diameter direction of the yarn path extending to the other side from the first bent section, the first mass point being disposed to connect one ends of the first and second edges on the inner periphery side of the yarn path, the second and third mass points being disposed on the other ends of the first and second edges on the outer peripheral side of the yarn path, the third edge being disposed to connect the second and third mass points to each other, the fourth edge being disposed to connect the first mass point of the first bent section to the first mass point of the second bent section which is the bent section disposed adjacent to the first bent section along the yarn path extending to the one side from the first bent section, the fifth edge being disposed to connect the second mass point of the first bent section to the second mass point of the second bent section, the sixth edge being disposed to connect the first mass point of the first bent section to the first mass point of the third bent section which is the bent section disposed adjacent to the first bent section along the yarn path extending to the other side from the first bent section, the seventh edge being disposed to connect the third mass point of the first bent section to the third mass point of the third bent section, the first and second edges having the second spring component, the initial length of which is defined by the yarn diameter characteristic, the third edge having the third spring component, the initial length of which is defined by the intersection elongation characteristic, and the fourth to seven edges each having the first spring component, the elastic coefficient of which is defined by the elongation characteristic.

According to this configuration, the dynamic model of a warp knit considering the thickness of a yarn can be reproduced realistically.

(9) It is preferred that the yarn path have the blind lap in which the bridges are connected to each other while meandering in the warp direction without having the loops interposed therebetween, that the loops configuring the normal lap be arrayed substantially parallel to a horizontal plane, that the bridge configuring the normal lap be configured by two leg parts extending substantially perpendicularly to the horizontal plane, and the ceiling part that connects the upper ends of the two leg parts in a direction that is substantially parallel to the horizontal plane, that the bridges configuring the blind lap be substantially parallel to the horizontal plane, and that, when the leg parts exist in a triangular internal region enclosed by the target first bridge configuring the blind lap and the second bridge connected to one end of the first bridge, the initial model generation portion specify the leg part nearest to the connection point between the first and second bridges out of the leg parts existing in the triangular internal region, and connects the specified leg part to the connection point between the first and second bridges.

According to this configuration, when the leg parts exist in the triangular internal region enclosed by the target first bridge configuring the blind lap and the second bridge connected to one end of the first bridge, the leg part nearest to the connection point between the first and second bridges out of the leg parts existing in the triangular internal region is connected to the connection point between the first and second bridges. Therefore, the blind lap can be held in the normal lap naturally.

(10) It is preferred that the position correction portion set a mass point in the connection point between the bridges configuring the blind lap and solve the motion equations.

According to this configuration, because a mass point is set in the connection point between the bridges configuring the blind lap and the motion equations are solved, the normal lap can held blind lap.

The invention claimed is:

1. A non-transitory, computer-readable recording medium which stores a knitting structure model generation program for generating a knitting structure model of a warp knit in a virtual three-dimensional space, the program causing a computer to function as:
a path information acquisition portion for acquiring yarn path information representing a yarn path in a warp direction of the warp knit;
an array information acquisition portion for acquiring array information representing an array position in a weft direction of the yarn path represented by the yarn path information;
an initial model generation portion for generating in the virtual three-dimensional space an initial model of the warp knit in which the yarn path is expressed in a broken line, in accordance with the yarn path information and the array information;
a position correction portion for setting mass points of a yarn in characteristic positions on the yarn path constituting the initial model, generating a dynamic model of the warp knit by connecting the mass points by using an edge applied with a dynamic characteristic of an actual yarn that is obtained by measuring the actual yarn, and correcting the position of each mass point by solving a motion equation of each mass point; and
a three-dimensional model generation portion for forming a surface expressing a yarn surface on a yarn path represented by the edge connected to the mass points whose positions are corrected by the position correction portion, and thereby generating a three-dimensional model of the warp knit, wherein
the dynamic model has a coarse dynamic model that does not take into account the thickness of a yarn and a dense dynamic model that takes into account the thickness of a yarn, and
the position correction portion uses the coarse dynamic model until the positions of the mass points converge within a predetermined range, and uses the dense dynamic model after the positions of the mass points converge within the predetermined range.

2. The computer-readable recording medium according to claim 1, wherein
the warp knit is configured by a plurality of warp-knitted layers stacked in a height direction perpendicular to the warp direction and the weft direction,
the yarn path information represents one column of yarn path in the warp direction of each warp-knitted layer, and
the array information represents an array position in the weft direction of each warp-knitted layer of the yarn path represented by the yarn path information.

3. The computer-readable recording medium according to claim 1, wherein
the yarn path has a normal lap that is configured by a plurality of loops arrayed in the warp direction at certain intervals, and a bridge that connects the loops to meander along the yarn path, and wherein
the yarn path information expresses the normal lap by successively arraying first and second positional data along the yarn path, the first and second positional data representing positions in the weft direction of first and second end points representing two end points on each loop.

4. The computer-readable recording medium according to claim 3, wherein the first positional data is located further on an upstream side of the yarn path than the second positional data, and wherein the yarn path information of the normal lap sets a first loop as an open stitch when a yarn path direction in the weft direction of a target bridge that connects a target first loop and a second loop located further on a downstream side on the yarn path than the first loop is same as a vector direction directed from a first end point configuring the first loop to a second end point, and also sets the first loop as a closed stitch when a yarn path direction in the weft direction of the target bridge is opposite to the vector direction directed from the first end point configuring the first loop to the second end point.

5. The computer-readable recording medium according to claim 1, further comprising a color information acquisition portion for acquiring color information representing a color of each yarn path configuring the warp knit, wherein
the initial model generation portion sets the color of each yarn in accordance with the color information.

6. The computer-readable recording medium according to claim 1, wherein
the dynamic characteristic includes an elongation characteristic of the yarn that represents a relationship between a tension applied to the yarn and an elongation of the yarn resulting from the tension, and
the coarse dynamic model is configured by one mass point disposed in a bent section of the yarn path, and an edge connecting the mass points along the yarn path,
the edge having a spring component whose elastic coefficient is defined by the elongation characteristic.

7. The computer-readable recording medium according to claim 5, wherein
the dynamic characteristic includes not only the elongation characteristic but also a yarn diameter characteristic representing a relationship between a tension applied to the yarn and a yarn diameter resulting from the tension, and further includes an intersection elongation characteristic representing a relationship between a tension applied to the yarn at an intersecting point where yarns intersect with each other and a yarn diameter resulting from the tension, and wherein
the dense dynamic model has first to third mass points disposed in each bent section and first to seventh edges connecting the first to third mass points together,
the first edge is disposed along a diameter direction of a yarn path extending to one side from a target first bent section,
the second edge is disposed along the diameter direction of the yarn path extending to the other side from the first bent section,
the first mass point is disposed to connect one end of each of the first and second edges on an inner periphery side of the yarn path,
the second and third mass points are disposed on the other end of each of the first and second edges on an outer peripheral side of the yarn path,
the third edge is disposed to connect the second and third mass points to each other,
the fourth edge is disposed to connect the first mass point of the first bent section to the first mass point of a second bent section which is a bent section disposed adjacent to the first bent section along the yarn path extending to the one side from the first bent section,
the fifth edge is disposed to connect the second mass point of the first bent section to the second mass point of the second bent section,
the sixth edge is disposed to connect the first mass point of the first bent section to the first mass point of the third bent section which is a bent section disposed adjacent to the first bent section along the yarn path extending to the other side from the first bent section,
the seventh edge is disposed to connect the third mass point of the first bent section to the third mass point of the third bent section,
the first and second edges include a second spring component, an initial length of which is defined by the yarn diameter characteristic,
the third edge includes a third spring component, an initial length of which is defined by the intersection elongation characteristic, and
the fourth to seventh edges each include a first spring component, an elastic coefficient of which is defined by the elongation characteristic.

8. The computer-readable recording medium according to claim 3, wherein
the yarn path has a blind lap in which the bridges are connected to each other to meander in the warp direction without having the loops interposed therebetween,
the loops configuring the normal lap are arrayed substantially parallel to a horizontal plane,
the bridge configuring the normal lap is configured by two leg parts extending substantially perpendicularly to the horizontal plane, and a ceiling part that connects upper ends of the two leg parts in a direction that is substantially parallel to the horizontal plane,
the bridges configuring the blind lap are substantially parallel to the horizontal plane, and
when the leg parts exist in a triangular internal region enclosed by a target first bridge configuring the blind lap and a second bridge connected to one end of the first bridge, the initial model generation portion specifies the leg part nearest to a connection point between the first and second bridges out of the leg parts existing in the triangular internal region, and connects the specified leg part to the connection point between the first and second bridges.

9. The computer-readable recording medium according to claim 8, wherein the position correction portion sets a mass point in the connection point between the bridges configuring the blind lap and solves the motion equations.

10. A knitting structure model generation apparatus for generating a knitting structure model of a warp knit in a virtual three-dimensional space, the apparatus comprising:
a path information acquisition portion for acquiring yarn path information representing a yarn path in a warp direction of the warp knit;
an array information acquisition portion for acquiring array information representing an array position in a weft direction of the yarn path represented by the yarn path information;
an initial model generation portion for generating in the virtual three-dimensional space an initial model of the warp knit in which the yarn path is expressed in a broken line, in accordance with the yarn path information and the array information;
a position correction portion for setting mass points of a yarn in characteristic positions on the yarn path constituting the initial model, generating a dynamic model of the warp knit by connecting the mass points by using an edge applied with a dynamic characteristic of an actual yarn obtained by measuring the actual yarn, and correcting the position of each mass point by solving a motion equation of each mass point; and
a three-dimensional model generation portion for forming a surface expressing a yarn surface on a yarn path represented by the edge connected to the mass points whose positions are corrected by the position correction portion, and thereby generating a three-dimensional model of the warp knit, wherein
the dynamic model has a coarse dynamic model that does not take into account the thickness of a yarn and a dense dynamic model that takes into account the thickness of a yarn, and
the position correction portion uses the coarse dynamic model until the positions of the mass points converge within a predetermined range, and uses the dense dynamic model after the positions of the mass points converge within the predetermined range.

11. A knitting structure model generation method for generating a knitting structure model of a warp knit in a virtual three-dimensional space, the method comprising:

a step in which a computer acquires yarn path information representing a yarn path in a warp direction of the warp knit;

a step in which the computer acquires array information representing an array position in a weft direction of the yarn path represented by the yarn path information;

a step in which the computer generates in the virtual three-dimensional space an initial model of the warp knit in which the yarn path is expressed in a broken line, in accordance with the yarn path information and the array information;

a step in which the computer sets mass points of a yarn in characteristic positions on the yarn path constituting the initial model, generating a dynamic model of the warp knit by connecting the mass points by using an edge applied with a dynamic characteristic of an actual yarn obtained by measuring the actual yarn, and correcting the position of each mass point by solving a motion equation of each mass point; and a step in which the computer forms a surface expressing a yarn surface on a yarn path represented by the edge connected to the mass points whose positions are corrected, and thereby generating a three-dimensional model of the warp knit, wherein the dynamic model has a coarse dynamic model that does not take into account the thickness of a yarn and a dense dynamic model that takes into account the thickness of a yarn, and the computer uses the coarse dynamic model until the positions of the mass points converge within a predetermined range, and uses the dense dynamic model after the positions of the mass points converge within the predetermined range.

* * * * *